US012768420B2

(12) United States Patent
Shintani et al.

(10) Patent No.: US 12,768,420 B2
(45) Date of Patent: Oct. 20, 2026

(54) VIBRATION ISOLATING STRUCTURE

(71) Applicant: NATURE ARCHITECTS INC., Tokyo (JP)

(72) Inventors: Kunitaka Shintani, Tokyo (JP); Kai Suto, Tokyo (JP)

(73) Assignee: NATURE ARCHITECTS INC., Tokyo (JP)

( * ) Notice: Subject to any disclaimer, the term of this patent is extended or adjusted under 35 U.S.C. 154(b) by 345 days.

(21) Appl. No.: 18/688,047

(22) PCT Filed: Aug. 30, 2021

(86) PCT No.: PCT/JP2021/031745
§ 371 (c)(1),
(2) Date: Feb. 29, 2024

(87) PCT Pub. No.: WO2023/032003
PCT Pub. Date: Mar. 9, 2023

(65) Prior Publication Data
US 2024/0384772 A1 Nov. 21, 2024

(51) Int. Cl.
*F16F 3/02* (2006.01)
*F16F 15/04* (2006.01)

(52) U.S. Cl.
CPC .............. *F16F 3/023* (2013.01); *F16F 15/04* (2013.01); *F16F 2226/04* (2013.01)

(58) Field of Classification Search
CPC .......... F16F 3/023; F16F 15/04; F16F 2226/04
USPC ....... 52/167.1–167.8; 188/378–380; 267/136; 248/560, 562, 619
See application file for complete search history.

(56) References Cited

U.S. PATENT DOCUMENTS 5,310,157 A * 5/1994 Platus .................... F16F 15/073 248/619
5,870,863 A * 2/1999 Taylor .................... E04H 9/0237 52/167.3
5,946,866 A * 9/1999 Weglewski ............... F16F 1/40 52/167.7
6,462,635 B1 10/2002 Noe
(Continued)

FOREIGN PATENT DOCUMENTS

CN 111191378 A 5/2020
CN 113090647 B 3/2022
(Continued)

OTHER PUBLICATIONS

Nov. 2, 2021 International Search Report issued in International Patent Application No. PCT/JP2021/031745.

*Primary Examiner* — Christopher P Schwartz
(74) *Attorney, Agent, or Firm* — Oliff PLC

(57) ABSTRACT

The node is located on a first position side of the vibration exciter or a second position side of the vibration receiver with respect to the one end of the first beam and the one end of the second beam in an axial direction of an axis passing through the first position and the second position. A rotational displacement of the node is excited by a translational displacement of the vibration exciter and a translational displacement of the node associated with the translational displacement of the vibration exciter, and exhibits anti-resonance at a frequency within a frequency range higher than a first resonance frequency of the vibration isolating structure and lower than a second resonance frequency.

4 Claims, 20 Drawing Sheets

(56) References Cited

U.S. PATENT DOCUMENTS

| | | | | |
|---|---|---|---|---|
| 8,136,309 | B2 * | 3/2012 | Rahimian | E04H 9/0235 188/380 |
| 8,851,460 | B2 * | 10/2014 | Muska | G08C 17/00 267/136 |
| 10,422,405 | B2 * | 9/2019 | Donaldson | F16F 15/03 |
| 2011/0209958 | A1 * | 9/2011 | Badre-Alam | F16F 3/12 267/164 |
| 2020/0206777 | A1 | 7/2020 | Suzuki et al. | |

FOREIGN PATENT DOCUMENTS

| | | | |
|---|---|---|---|
| EP | 0 942 192 | B1 | 6/2003 |
| JP | 2000-325884 | A | 11/2000 |
| JP | 2008-046618 | A | 2/2008 |
| JP | 2020-106080 | A | 7/2020 |
| JP | 2020-133568 | A | 8/2020 |

* cited by examiner

VIBRATION ISOLATING STRUCTURE

This is a national phase application of PCT/JP2021/031745 filed Aug. 30, 2021, the contents of which are incorporated herein by reference.

TECHNICAL FIELD

The present disclosure relates to a vibration isolating structure.

BACKGROUND

Conventionally, an apparatus is proposed in which a plurality of piezoelectric actuators are arranged on a surface of a plate-shaped member, and at least one piezoelectric sensor is arranged at a position between the plurality of piezoelectric actuators on the surface of the plate-shaped member, and a control circuit performs feedback control of operations of the plurality of piezoelectric actuators based on an output voltage of the piezoelectric sensor so that vibration of the plate-shaped member is suppressed (see Patent Document 1).

CITATION LIST

Patent Literature

PTL: JP2020-106080A

SUMMARY

In the apparatus described above, it is necessary to use at least one piezoelectric sensor, the plurality of piezoelectric actuators, and the control circuit to suppress vibration of the plate-shaped member. Therefore, it is necessary to provide a vibration isolating structure capable of reducing vibration transmitted from a vibration exciter to a vibration receiver without using these components.

According to one aspect of the present disclosure, the following vibration isolating structure is provided. The vibration isolating structure capable of reducing vibration transmitted from a vibration exciter to a vibration receiver, includes a first beam, one end of which is connected to the vibration exciter directly or via a first support and a second beam, one end of which is connected to the vibration receiver directly or via a second support and the other end of which is connected to the other end of the first beam via a node. The node is located on a first position side of the vibration exciter or a second position side of the vibration receiver with respect to the one end of the first beam and the one end of the second beam in an axial direction of an axis passing through the first position and the second position. A rotational displacement of the node is excited by a translational displacement of the vibration exciter and a translational displacement of the node associated with the translational displacement of the vibration exciter, and exhibits anti-resonance at a frequency within a frequency range higher than a first resonance frequency and lower than a second resonance frequency of the vibration isolating structure.

Other features and advantages of the present disclosure can be understood from following description and accompanying drawings, which are given illustratively and non-exhaustively.

DESCRIPTION OF EMBODIMENTS

The following describes some aspects of the disclosure with reference to embodiments.

Figure 1:
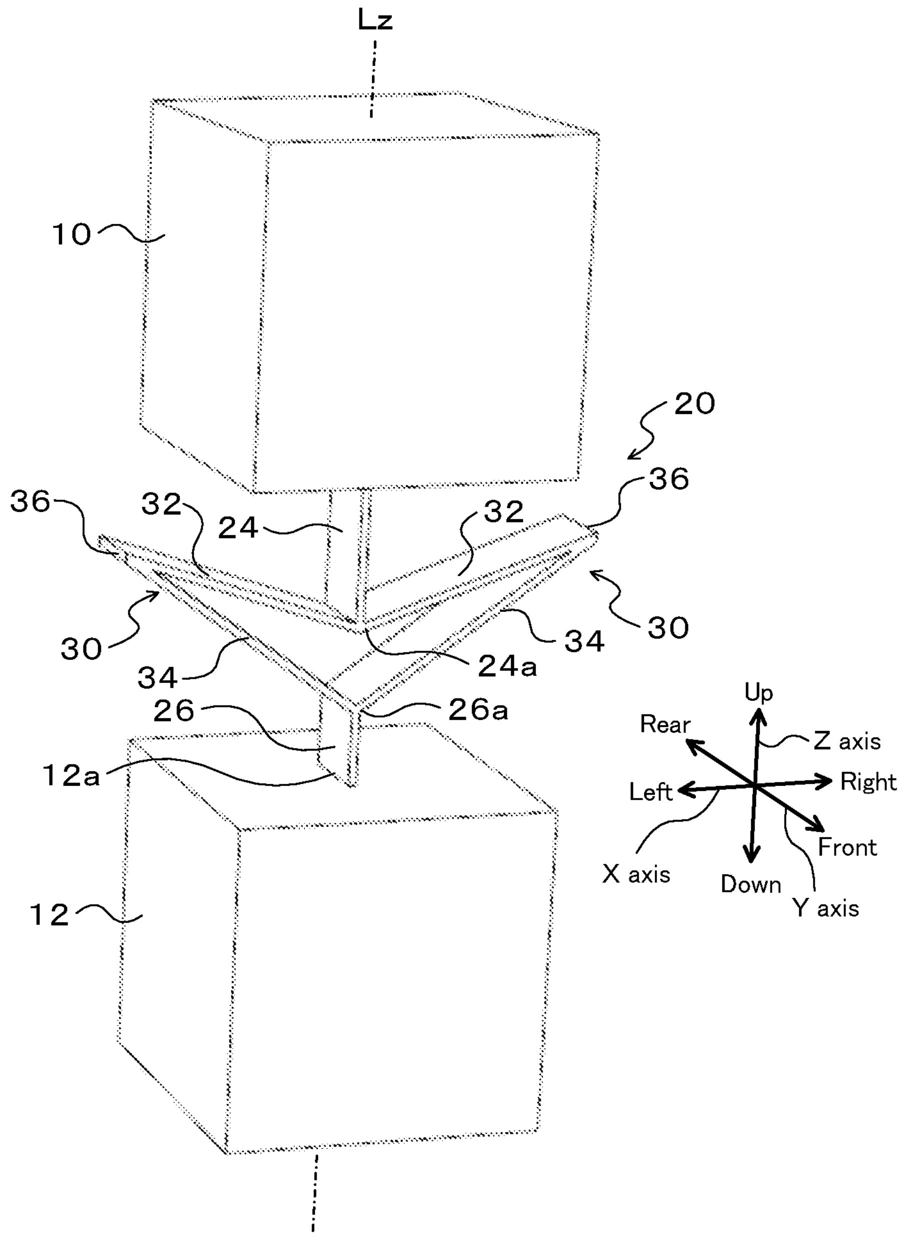
FIG. 1 is an external perspective view of a vibration isolating structure 20 according to one embodiment.
Figure 2:
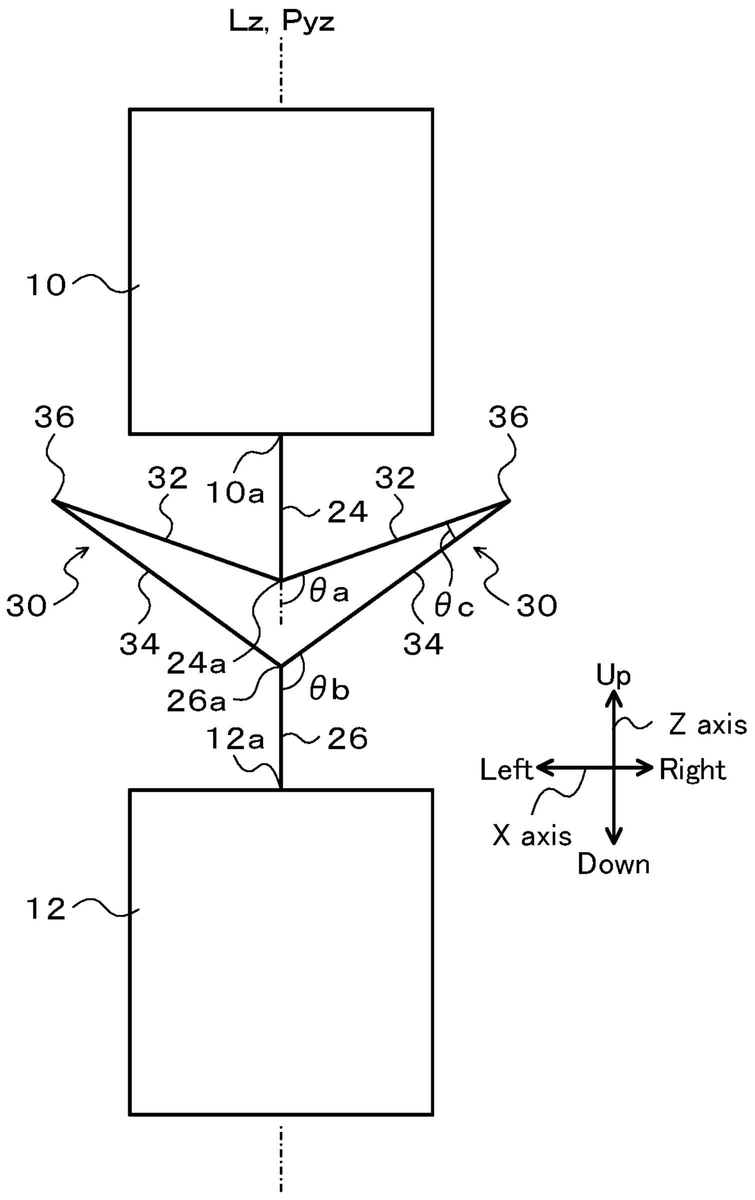
FIG. 2 is a front view of the vibration isolating structure 20 according to the embodiment.
Figure 3A:
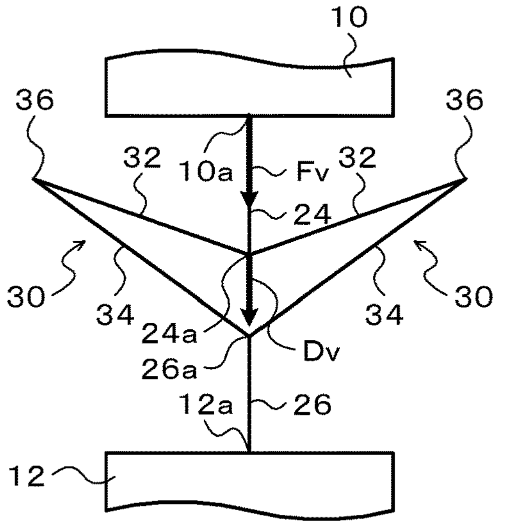
FIG. 3 is a diagram showing operation of the vibration isolating structure 20 according to the embodiment.
Figure 3B:
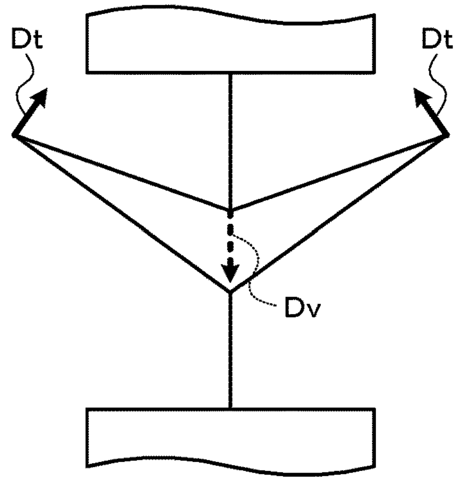
Figure 3C:
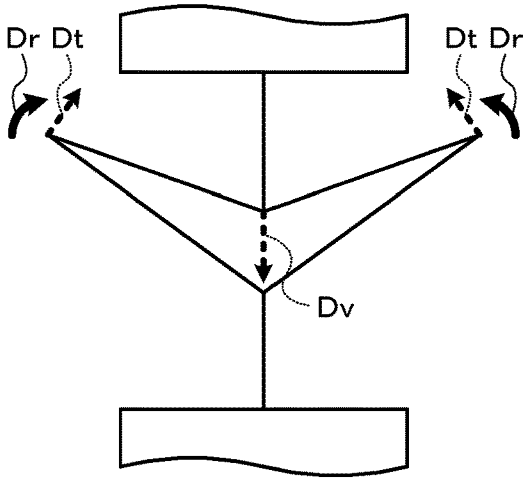
Figure 3D:
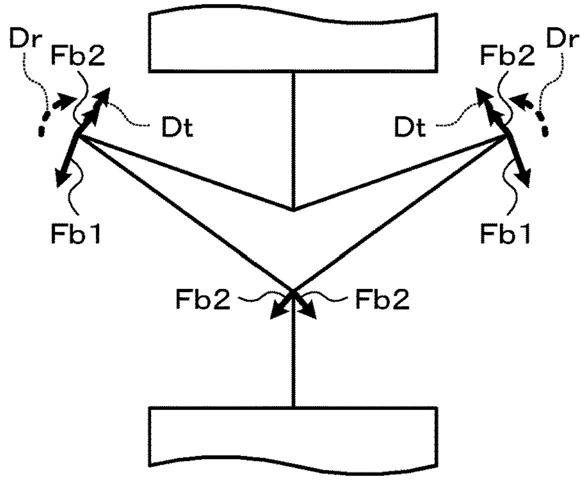
Figure 3E:
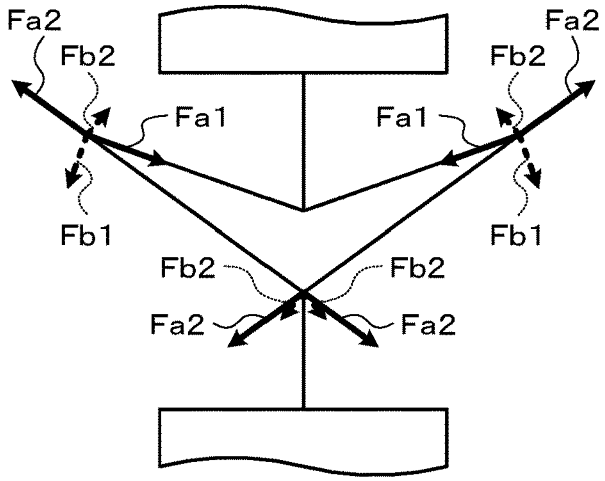
Figure 3F:
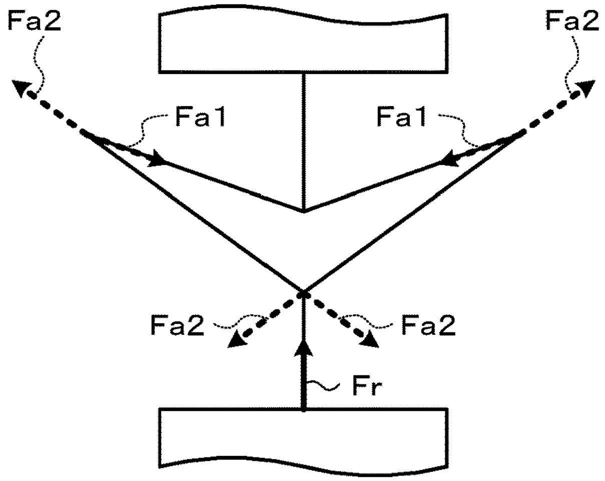

FIG. 1 is an external perspective view of a vibration isolating structure 20 according to one embodiment of the present disclosure. FIG. 2 is a front view of the vibration isolating structure 20. In the embodiment, the left-right direction (X-axis direction), the forward-rearward direction (Y-axis direction), and the upward-downward direction (Z-axis direction) are as shown in FIGS. 1 and 2. The straight line in the upward-downward direction passing through the center of gravity of the vibration isolating structure 20 is referred to as the axis line Lz, and the XY, YZ and XZ planes including the center of gravity (axis line Lz) of the vibration are to as the isolating structure 20 referred to as the predetermined planes Pxy, Pyz, and Pxz, respectively. The arrangement of the vibration isolating structure 20 is not limited to the orientation shown in FIGS. 1 and 2.

The vibration isolating structure 20 of the embodiment is configured as an integrally molded member integrally molded by, for example, injection molding, blow molding, extrusion molding, or 3D printing of resin or rubber material or by, for example, casting, forging, pressing, cutting, extrusion molding, or 3D printing of metal material, or the like. As shown in FIGS. 1 and 2, the vibration isolating structure 20 is fixed to the lower surface of the mounting member 10, which is the vibration exciter member and to the upper surface of the base member 12, which is the vibration receiving member. Thus, the mounting member 10 is supported by the base member 12 via the vibration isolating structure 20.

As shown in FIGS. 1 and 2, the vibration isolating structure 20 includes a first shaft (first support) 24, a second shaft (second support) 26, and two vibration isolators 30. The vibration isolating structure 20 is formed to be a mirror image (plane symmetry) of each other with respect to the predetermined plane Pyz (see FIG. 2) and the predetermined plane Pxz (not shown), and so that the depths (length in the forward-rearward direction) of the first shaft 24, the second shaft 26 and the two vibration isolators 30 are constant.

The first shaft 24 and the second shaft 26 are each formed into a rectangular parallelepiped shape extending in the upward-downward direction along the axis line Lz. The first shaft 24 and the second shaft 26 are arranged to be spaced apart from each other in the upward-downward direction. An upper end of the first shaft 24 is fixed to the lower surface of the mounting member 10, and a lower end of the second shaft 26 is fixed to the upper surface of the base member 12. The part fixed by the vibration isolating structure 20 (the first shaft 24) in the mounting member 10 is referred to as a "vibration exciter 10*a*", and the part fixed by the vibration isolating structure 20 (the second shaft 26) in the base member 12 is referred to as a "vibration receiver 12*a*". As described above, the vibration isolating structure 20 is formed to be the mirror image of the predetermined planes Pyz and Pxz, and the first shaft 24 and the second shaft 26 are each formed into the rectangular parallelepiped shape. Therefore, the vibration exciter 10*a* and the vibration receiver 12*a* are each formed into the rectangular shape, and the axis line Lz passes through the center of the vibration exciter 10*a* and the center of the vibration receiver 12*a*. In the embodiment, a position in the vibration exciter 10*a* through which the axis line Lz passes corresponds to the "first position", and a position in the vibration receiver 12*a* through which the axis line Lz passes corresponds to the "second position".

The two vibration isolators 30 have a first beam 32 and a second beam 34, respectively. The first beam 32 is formed to extend in a straight line, and one end of the first beam 32 is connected to the lower end 24*a* of the first shaft 24. The second beam 34 is formed to extend in a straight line, and one end of the second beam 34 is connected to the upper end 26*a* of the second shaft 26, and the other end of the second beam 34 is connected to the other end of the first beam 32 via a node 36. The node 36 is located on an upper side (the side of the mounting member 10) with respect to the one end of the first beam 32 (the lower end 24*a* of the first shaft 24) and the one end of the second beam 34 (the upper end 26*a* of the second shaft 26) in the upward-downward direction in the figure. Therefore, the angle θa between the first beam 32 and the downward direction of the axis line Lz (on the side of the second shaft 26) is an obtuse angle, the angle θb between the second beam 34 and the downward direction of the axis line Lz is an obtuse angle larger than the angle θa, the angle θc between the first beam 32 and the second beam 34 via the node 36 is an acute angle equal to the angle θb minus the angle θa.

FIG. 3 is a diagram showing the operation of the vibration isolating structure 20 according to the embodiment. In the vibration isolating structure 20 of the embodiment, as shown in FIG. 3(A), when a downward force Fv along the axis line Lz is generated in the vibration exciter 10*a*, causing a translational displacement Dv of the vibration exciter 10*a* and the first shaft 24, as shown in FIG. 3(B), the translational displacement Dv of the first shaft 24 (lower end 24*a*) causes a translational displacement Dt of the node 36 (0th relationship), and then, as shown in FIG. 3(C), the translational displacement Dv of the first shaft 24 (lower end 24*a*) and the translational displacement Dt of the node 36 cause a rotational displacement Dr of the node 36 (1st relationship). Then, as shown in FIG. 3(D), the translational displacement Dt and the rotational displacement Dr of the node 36 cause bending forces Fb1 and Fb2 of the first beam 32 and the second beam 34 (2nd relationship). The axial forces Fa1 and Fa2 of the first beam 32 and the second beam 34 are generated as shown in FIG. 3(E) in balance with the bending forces Fb1 and Fb2 of the first beam 32 and the second beam 34 (3rd relationship). Then, as shown in FIG. 3(F), the axial forces Fa1 and Fa2 of the first beam 32 and the second beam 34 cause a reaction force Fr of the vibration receiver 12*a* (4th relationship).

The translational displacement Dv of the vibration exciter 10*a* and the first shaft 24 is determined by the stiffness and inertia of the entire system including the mounting member 10 and the vibration isolating structure 20. In the 0th relationship, the translational displacement Dt of the node 36 is geometrically determined by the translational displacement Dv of the first shaft 24 (the lower end 24*a*), because the first beam 32 does not (nearly) expand or contract. In the 1st relationship, the rotational displacement Dr of the node 36 is determined by the balance of the moments of the node 36. At this point, all displacements of the first beam 32 and the second beam 34 are determined. In the 2nd relationship, the bending forces Fb1 and Fb2 of the first beam 32 and the second beam 34 are determined by the stiffness and the mass of the first beam 32 and the second beam 34, and the translational displacement Dt and the rotational displacement Dr of the node 36. In the 3rd relationship, the axial forces Fa1 and Fa2 of the first beam 32 and the second beam 34 are determined by the balance of forces at the node 36. At this point, all forces resulting from the deformation of the first beam 32 and the second beam 34 are determined. Originally, the translational displacement Dt of the node 36 is intended to change as the axial forces Fa1 and Fa2 of the first beam 32 and the second beam 34 change. However, in the embodiment, the axial stiffness of the first beam 32 and the second beam 34 is large, and these axial forces are determined by their small translational displacements in the axial direction. It is assumed that a slight change in these axial forces Fa1 and Fa2 hardly changes the displacement of the node 36 (translational displacement Dt and rotational displacement Dr) and has no effect on the displacement of the node 36, which is determined by the 0th and 1st relationships. In the 4th relationship, the reaction force Fr in the vibration receiver 12*a* is determined by the balance of forces in the vibration receiver 12*a*.

Figure 4:
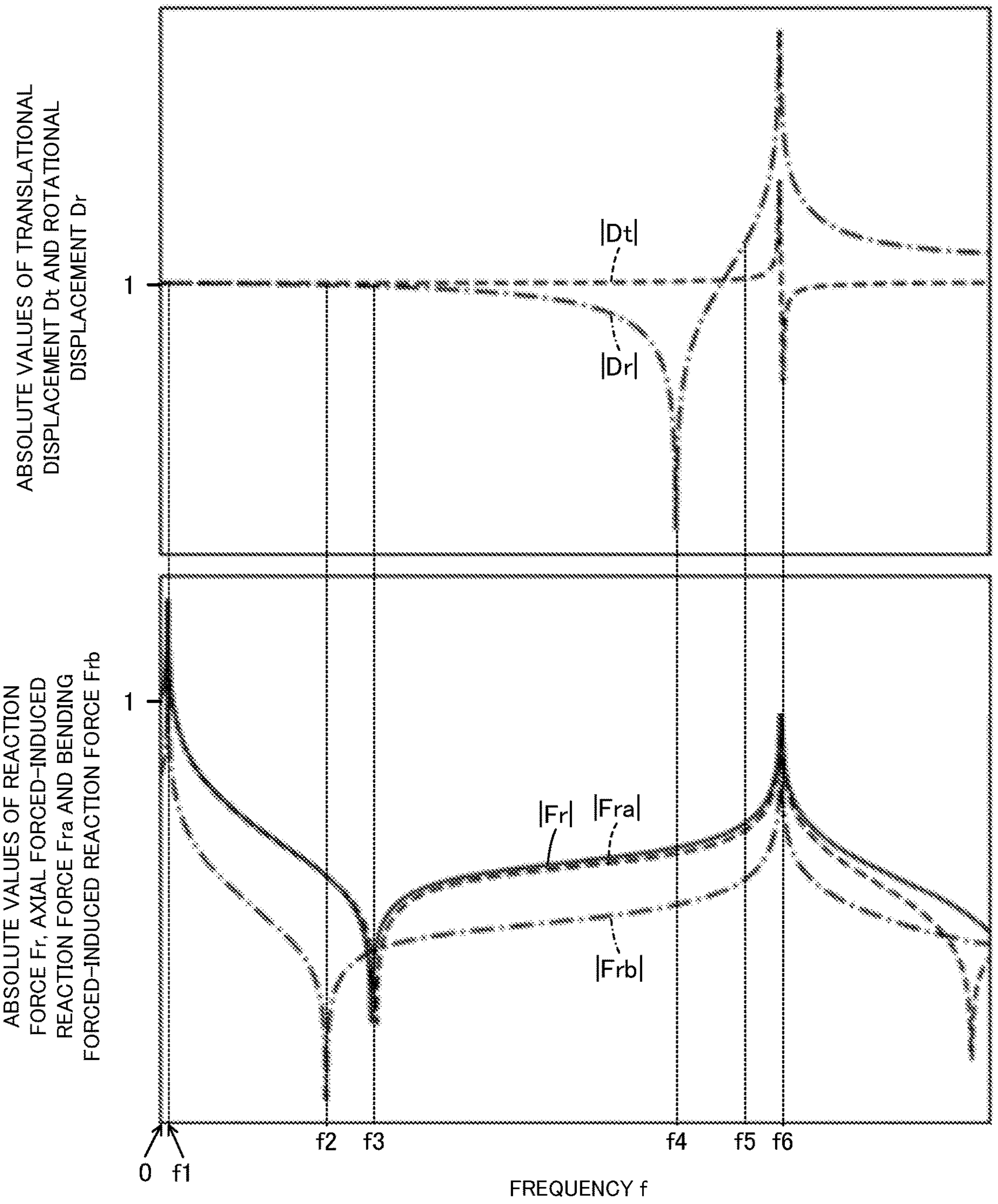
FIG. 4 is a diagram showing one example of a frequency characteristic of the vibration isolating structure 20 according to the embodiment.
Figure 5A:
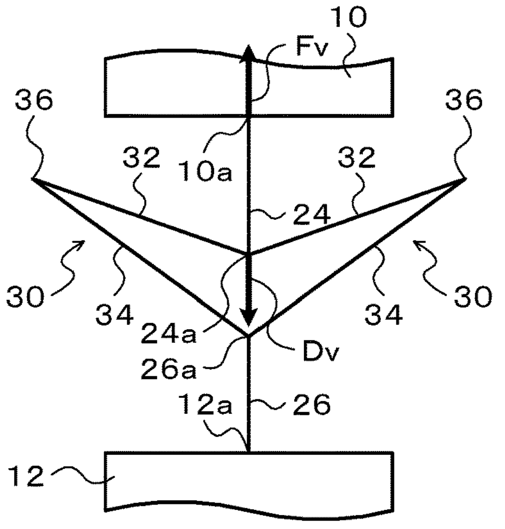
FIG. 5 is a diagram showing the operation of the vibration isolating structure 20 according to the embodiment.
Figure 5B:
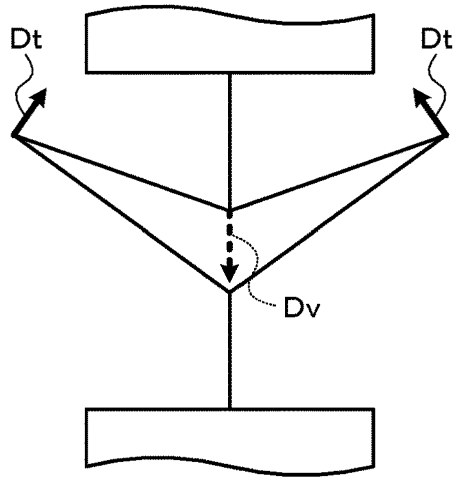
Figure 5C:
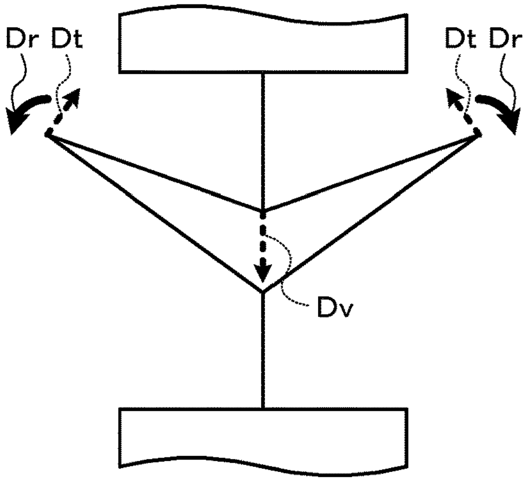
Figure 5D:
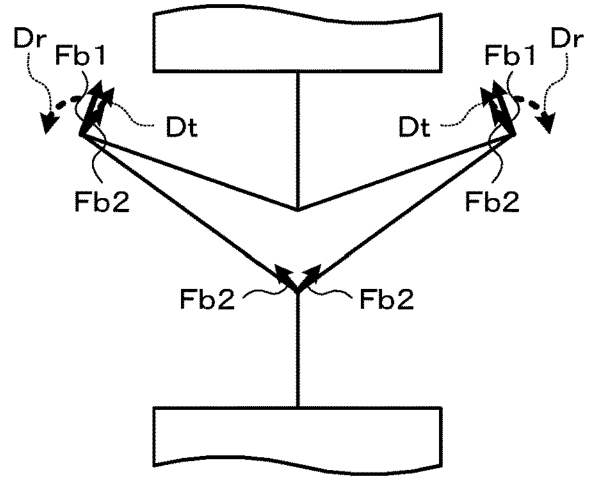
Figure 5E:
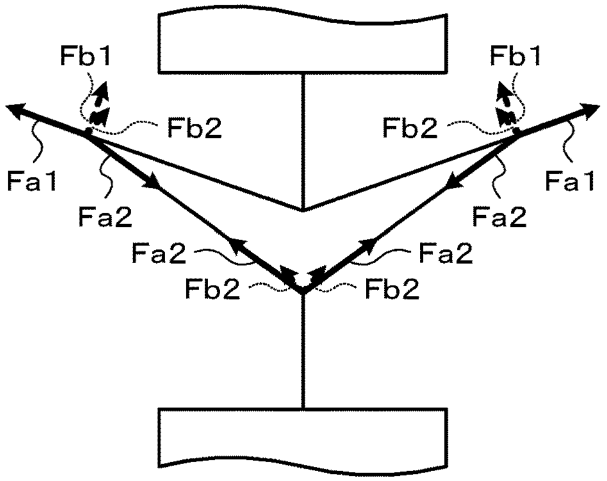
Figure 5F:
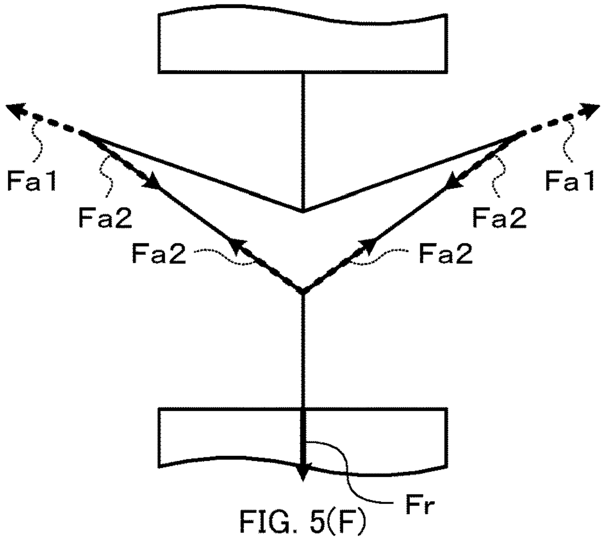

FIG. 4 is a diagram showing one example of a frequency characteristic of the vibration isolating structure 20 according to the embodiment. In FIG. 4, a horizontal axis (the linear axis) is a frequency f of the translational displacement Dv of the vibration exciter 10*a* and the first shaft 24. The vertical axis (the logarithmic axis) in the upper figure is the respective absolute values of the translational displacement Dt and the rotational displacement Dr of the node 36. The vertical axis (the logarithmic axis) in the lower figure is the absolute value of the reaction force Fr of the vibration receiver 12*a* and the respective absolute values of the contributions of the axial forces Fa1 and Fa2 and the bending forces Fb1 and Fb2 in the reaction force Fr of the vibration receiver 12*a* (hereinafter referred to as "axial force-induced reaction force Fra" or "bending force-induced reaction force Frb"). The translational displacement Dt of the node 36 is normalized by dividing "the translational displacement Dt of the node 36 at any frequency" by a product of "the translational displacement Dv of the first shaft 24 at that frequency" and "the translational displacement Dt of the node 36 at 0 Hz" and then multiplying it by "the translational displacement Dv of the first shaft 24 at 0 Hz". Thus, the absolute value of the translational displacement Dt of the node 36 corresponds to whether the translational displacement Dt of the node 36 with respect to the translational displacement Dv of the first shaft 24 is enhanced or suppressed compared to the case of 0 Hz. The rotational displacement Dr of the node 36 is normalized in the same manner as the translational displacement Dt of the node 36. The reaction force Fr of the vibration receiver 12*a*, the axial force-induced reaction force Fra, and the bending force-induced reaction force Frb are defined as values of the force Fv of the vibration exciter 10*a* (transmission ratio). Therefore, each absolute value of the reaction force Fr of the vibration receiver 12*a*, the axial force-induced reaction force Fra, and the bending force-induced reaction force Frb corresponds to the amplification or suppression of the force Fv of the vibration exciter 10*a*. The inventors obtained the frequency characteristic shown in FIG. 4 by analyzing the vibration isolating structure 20.

FIG. 4 shows that each absolute value of the reaction force Fr of the vibration receiver 12*a*, the axial force-induced reaction force Fra, and the bending force-induced reaction force Frb exhibits resonance (becomes a maximum value) when the frequency f of the translational displacement Dv of the vibration exciter 10*a* and the first shaft 24 is a value f1, the absolute value of the bending force-induced reaction force Frb exhibits anti-resonance (becomes a minimum value) when the frequency f is a value f2 higher than the value f1, and the absolute values of the reaction force Fr of the vibration receiver 12*a* and the axial force-induced reaction force Fra exhibit anti-resonance when the frequency f is a value f3 higher than the value f2. Also, the rotational displacement Dr of the node 36 exhibits anti-resonance when the frequency f is a value f4 higher than the value f3, the absolute values of the translational displacement Dt and the rotational displacement Dr of the node 36, and the absolute values of the reaction force Fr of the vibration receiver 12*a*, the axial force-induced reaction force Fra, and the bending force-induced reaction force Frb all exhibit resonance when the frequency f is a value f6 higher than the value f4. That is, in the vibration isolating structure 20, the vibration isolating structure 20 (the reaction force Fr of the vibration receiver 12*a*) exhibits first resonance and second resonance when the frequency f is the values f1 and f6, respectively, the rotational displacement Dr of the node 36 exhibits anti-resonance when the frequency f is the value f4, and the vibration isolating structure 20 (the reaction force Fr of the vibration receiver 12*a*) exhibits anti-resonance when the frequency f is the value f3. This enables the vibration isolating structure 20 to sufficiently reduce the vibration transmitted from the vibration exciter 10*a* to the vibration receiver 12*a* when the frequency f is around the value f3.

From the low side to the high side of the frequency f, the direction of the translational displacement Dv of the vibration exciter 10*a* and the first shaft 24 with respect to the direction of the force Fv of the vibration exciter 10*a* changes with the value f1 as a boundary, and the direction of the translational displacement Dt and the rotational displacement Dr of the node 36, the direction of the reaction force Fr of the vibration receiver 12*a*, the axial force-induced reaction force Fra, and the bending force-induced reaction force Frb change accordingly. The direction of the bending force-induced reaction force Frb with respect to the direction of the translational displacement Dv of the first shaft 24 changes with the value f2 as a boundary, the direction of the reaction force Fr and the axial force-induced reaction force Fra with respect to the direction of the translational displacement Dv of the first shaft 24 changes with the value f3 as a boundary. Further, the direction of the rotational displacement Dr of the node 36 with respect to the direction of the translational displacement Dv of the first shaft 24 changes with the value f4 as a boundary, the direction of the rotational displacement Dr of the node 36 with respect to the direction of the translational displacement Dv of the first shaft 24 changes with the value f6 as a boundary.

The following describes the details of the operation of the vibration isolating structure 20 when the frequency f of the translational displacement Dv of the vibration exciter 10*a* and the first shaft 24 is 0 Hz, which is lower than the value f1, and when the frequency f is a value f5, which is higher than the value f4 and lower than the value f6. FIG. 3 above shows the operation of the vibration isolating structure 20 when the frequency f of the translational displacement Dv of the vibration exciter 10*a* and the first shaft 24 is 0 Hz, and FIG. 5 shows the operation of the vibration isolating structure 20 when the frequency f is the value f5.

As shown in FIG. 3(*a*), the force Fv of the vibration exciter 10*a* and the translational displacement Dv of the vibration exciter 10*a* and the first shaft 24 are in the same direction with each other when the frequency f is 0 Hz, whereas as shown in FIG. 5(*a*), the force Fv of the exciter vibration 10*a* and the translational displacement Dv of the vibration exciter 10*a* and the first shaft 24 are in opposite directions with each other when the frequency f is the value f5. As shown in FIGS. 3(*b*) and 5(*b*), in the 0th relationship, the translational displacement Dt of the node 36 is determined by the translational displacement Dv of the first shaft 24 (lower end 24*a*) regardless of the frequency f. Furthermore, as shown in FIGS. 3(*c*) and 5(*c*), in the 1st relationship, the direction of the rotational displacement Dr of the node 36 with respect to the direction of the translational displacement Dt of the node 36 changes between when the frequency f is 0 Hz and when the frequency f is the value f5. This is because as the frequency f increases, the contribution of the inertia of the first beam 32 and the second beam 34 increases relative to the contribution of the stiffness of them in the rotational displacement Dr of the node 36, and the rotational displacement Dr of the node 36 is more easily excited to increase the mass transfer of the first beam 32 and the second beam 34.

In addition, as shown in FIGS. 3(*d*) and 5(*d*), in the 2nd relationship, the direction of the bending forces Fb1 and Fb2 of the first beam 32 and the second beam 34 with respect to the translational displacement Dv of the first shaft 24 changes between when the frequency f is 0 Hz and when the frequency f is the value f5. As shown in FIGS. 3(*e*) and 5(*e*), in the 3rd relationship, the direction of the axial forces Fa1 and Fa2 of the first beam 32 and the second beam 34 with respect to the translational displacement Dv of the first shaft 24 changes between when the frequency f is 0 Hz and when the frequency f is the value f5. Further, as shown in FIGS. 3(*f*) and 5(*f*), in the 4th relationship, the direction of the reaction force Fr of the vibration receiver 12*a* with to the translational respect displacement Dv of the first shaft 24 changes between when the frequency f is 0 Hz and when the frequency f is the value f5. Thus, since the direction of the reaction force Fr of the vibration receiver 12*a* with respect to the translational displacement Dv of the first shaft 24 is different when the frequency f is 0 Hz and when the frequency is the value f5, the reaction force Fr of the vibration receiver 12*a* exhibits anti-resonance at a certain frequency between 0 Hz and the value f5.

Figure 6:
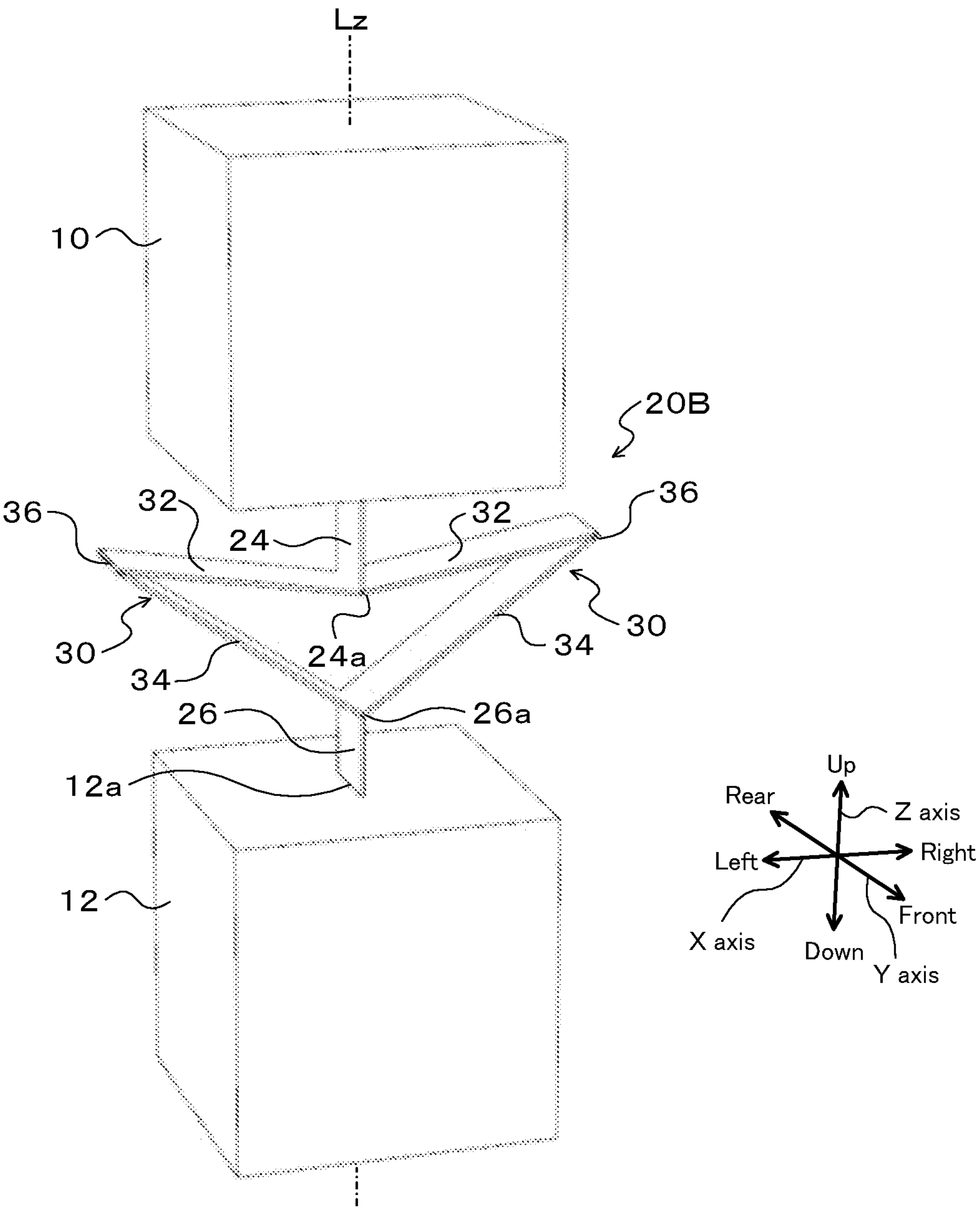
FIG. 6 is an external perspective view of a vibration isolating structure 20B according to comparative example.
Figure 7:
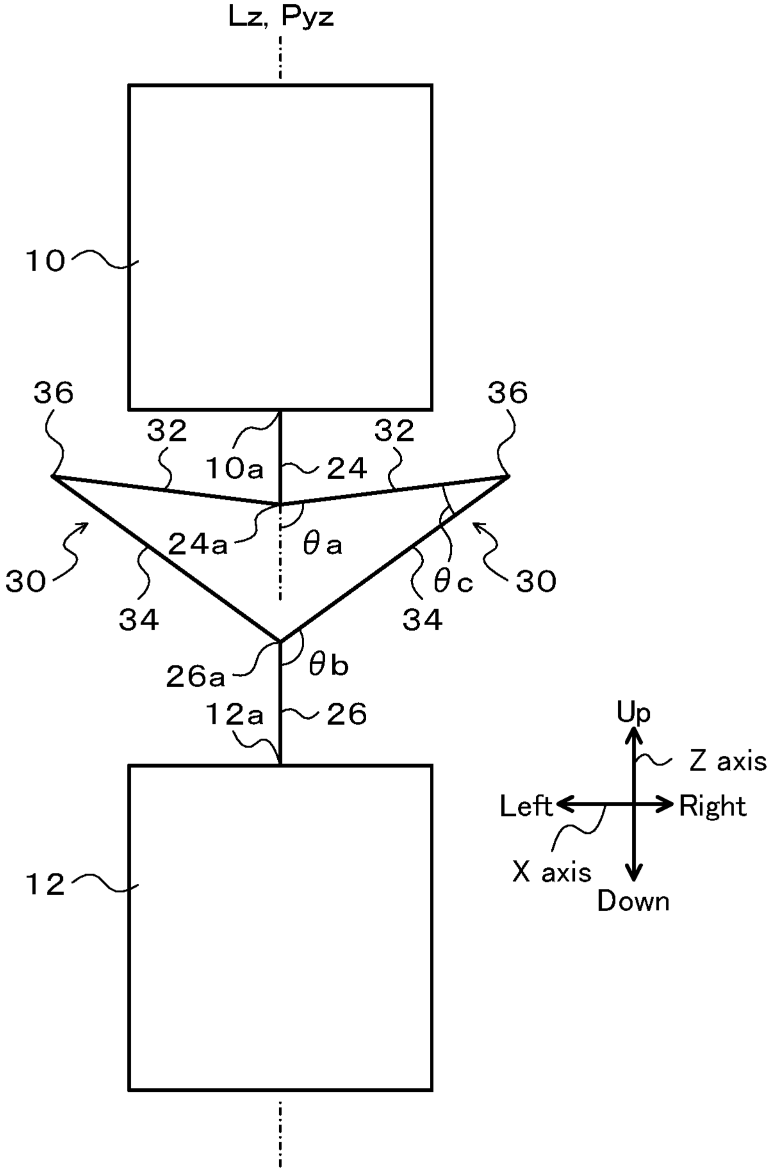
FIG. 7 is a front view of the vibration isolating structure 20B according to the comparative example.
Figure 8:
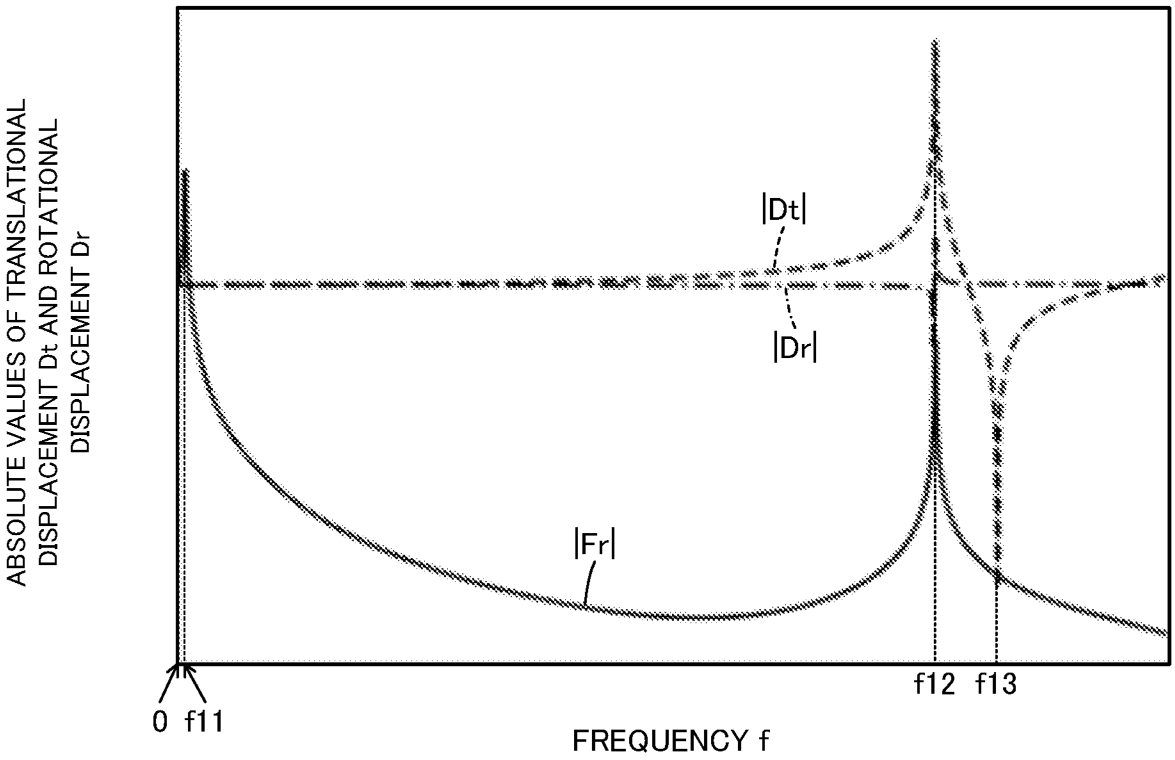
FIG. 8 is a diagram showing one example of a frequency characteristic of the vibration isolating structure 20B according to the comparative example.

FIG. 6 is an external perspective view of the vibration isolating structure 20B of the comparative example, and FIG. 7 is a front view of the vibration isolating structure 20B. FIGS. 6 and 7 correspond to FIGS. 1 and 2, respectively. The vibration isolating structure 20B of the comparative example differs from the vibration isolating structure 20 in that the angle θa is smaller and the angle θc is larger than that of the vibration isolating structure 20 of the embodiment, as shown in FIGS. 6 and 7. FIG. 8 is a diagram showing one example of the frequency characteristic of the vibration isolating structure 20B. In FIG. 8, the horizontal axis (the linear axis) is the frequency f of the translational displacement Dv of the vibration exciter 10*a* and the first shaft 24, and the vertical axis (the logarithmic axis) is the respective absolute values of the translational displacement Dt and the rotational displacement Dr of the node 36, and the reaction force Fr of the vibration receiver 12*a*. The inventors obtained the frequency characteristics shown in FIG. 8 by analyzing the vibration isolating structure 20B.

FIG. 8 shows that the absolute value of the reaction force Fr of the vibration receiver 12*a* exhibits resonance (becomes maximum value) when the frequency f of displacement Dv of the vibration the translational exciter 10*a* and the first shaft 24 is a value f11, each absolute value of the translational displacement Dt and the rotational displacement Dr of the node 36 and the absolute value of the reaction force Fr of the vibration receiver 12*a* exhibits resonance when the frequency f is a value f12 higher than the value f11, and the rotational displacement Dr of the node 36 exhibits anti-resonance when the frequency f is a value f13 higher than the value f12. That is, in the vibration isolating structure 20B, the vibration isolating structure 20B (the reaction force Fr of the vibration receiver 12*a*) exhibits first resonance and second resonance when the frequency f is the value f11 and f12, respectively, and the rotational displacement Dr of the node 36 exhibits anti-resonance when the frequency f is the value f13, and the vibration isolating structure 20B does not exhibit anti-resonance at any frequency.

From the low side to the high side of the frequency f, the direction of the translational displacement Dv of the vibration exciter 10*a* and the first shaft 24 with respect to the direction of the force Fv of the vibration exciter 10*a* changes at the value f11 as a boundary, and the direction of the translational displacement Dt and the rotational displacement Dr of the node 36 and the reaction force Fr of the vibration receiver 12*a* change accordingly. The direction of the rotational displacement Dr of the first shaft 24 with respect to the direction of the translational displacement Dv of the first shaft 24 changes at the value f12 as a boundary. The direction of the rotational displacement Dr of the first shaft 24 with respect to the direction of the translational displacement Dv of the first shaft 24 changes at the value f13 as the boundary.

From FIGS. 4 and 8, the following is apparent. As shown in FIG. 4, when the rotational displacement Dr of the node 36 exhibits the anti-resonance at a first frequency (the value f4) within a frequency range higher than the first resonance frequency and lower than the second resonance frequency of the vibration isolating structure 20 (the "f1<f<f6" range in FIG. 4), the vibration isolating structure 20 exhibits an anti-resonance at a second frequency (the value f3) within this frequency range. In contrast, as shown in FIG. 8, when the rotational displacement Dr of the node 36 does not exhibit the anti-resonance within a frequency range higher than the first resonance frequency and lower than the second resonance frequency of the vibration isolating structure 20B (the "f11<f<f12" range in FIG. 8), the vibration isolating structure 20B does not exhibit the anti-resonance at any frequency.

As mentioned above, as the frequency f increases, the contribution of the inertia of the first beam 32 and the second beam 34 increases relative to the contribution of the stiffness of them in the rotational displacement Dr of the node 36, and the rotational displacement Dr of the node 36 is more easily excited to increase the mass transfer of the first beam 32 and the second beam 34. Therefore, the direction of the rotational displacement Dr of the node 36 with respect to the direction of the translational displacement Dt of the node 36 changes when the frequency reaches a certain threshold value. The frequency at which the direction of the rotational displacement Dr of the node 36 with respect to the direction of the translational displacement Dt of the node 36 changes is determined by the dimensions, stiffness, and mass of the first beam 32 and the second beam 34, the angle formed between the beams, and other factors. In comparing the vibration isolating structure 20 of the embodiment shown in FIG. 2 with the vibration isolating structure 20B of the comparative example shown in FIG. 7, the respective angles θa and θc formed by the first beam 32 and the second beam 34 contribute significantly to this.

In the vibration isolating structure 20 of the embodiment shown in FIG. 2, as shown in FIG. 4, the rotational displacement Dr of the node 36 exhibits the anti-resonance at the frequency f4 between the first resonance frequency and the second resonance frequency, while as the angle θa formed by the first beam 32 is gradually reduced and the angle θc is gradually increased, the frequency at which the rotational displacement Dr of the node 36 exhibits the anti-resonance gradually increases and finally becomes larger than the second resonance frequency, as found by the inventors' analysis. Compared with the vibration isolating structure 20 of the embodiment shown in FIG. 2, in the vibration isolating structure 20B of the comparative example shown in FIG. 7, the angle θa is small and the angle θc is large to the extent that the rotational displacement Dr of the node 36 exhibits the anti-resonance at the frequency f13, which is larger than the second resonance frequency f12. Therefore, the reaction force Fr does not exhibit the anti-resonance at any frequency.

Figure 9:
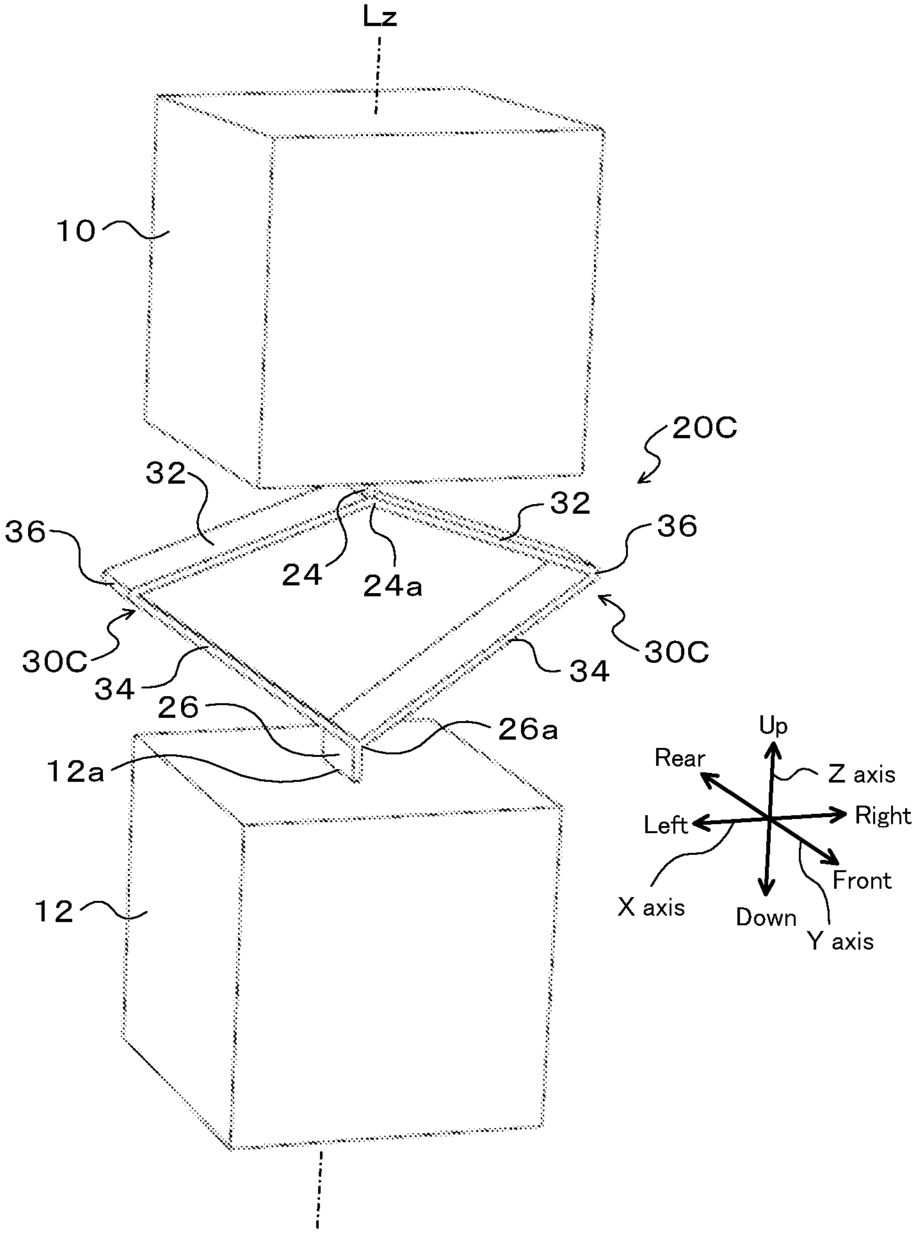
FIG. 9 is an external perspective view of a vibration isolating structure 20C according to comparative example.
Figure 10:
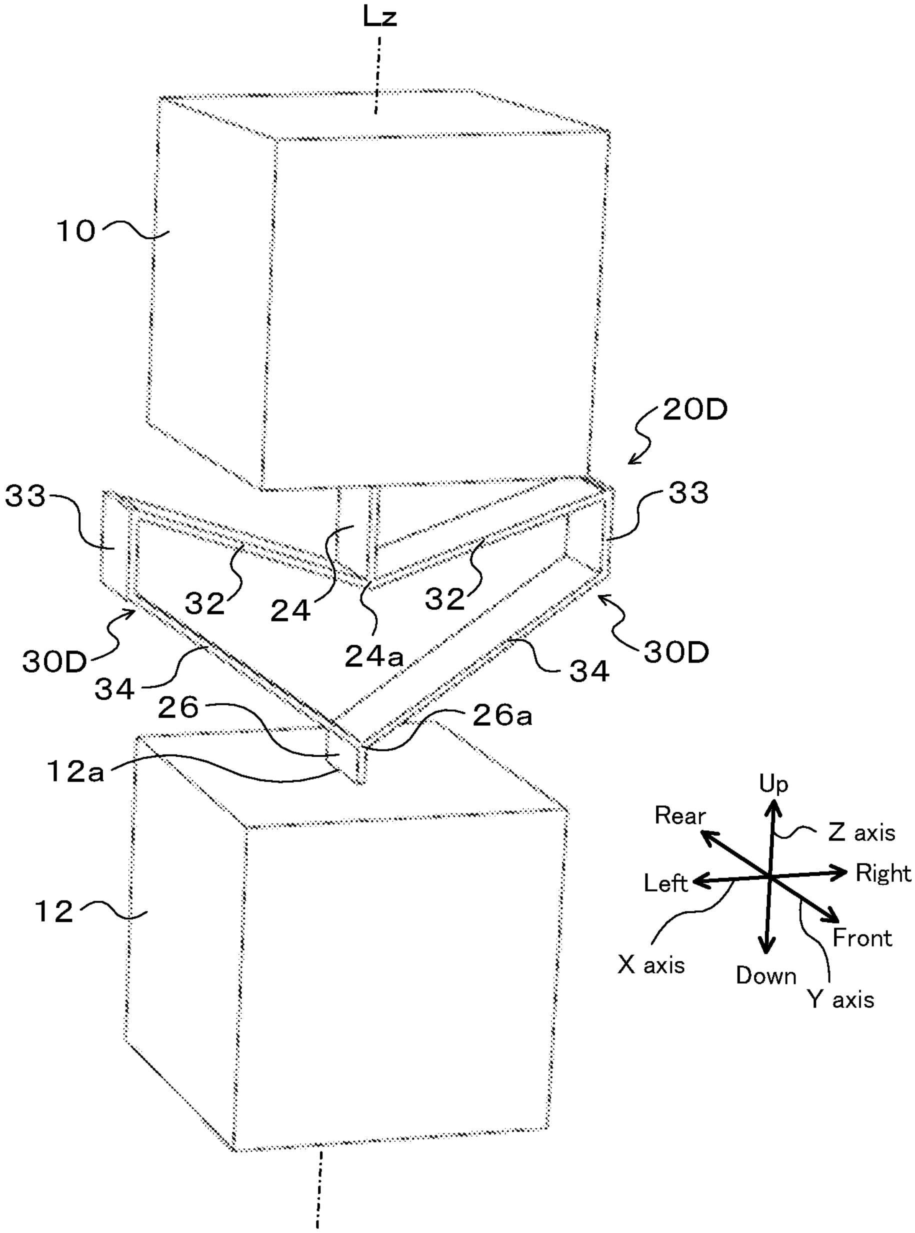
FIG. 10 is an external perspective view of a vibration isolating structure 20D according to comparative example.
Figure 11:
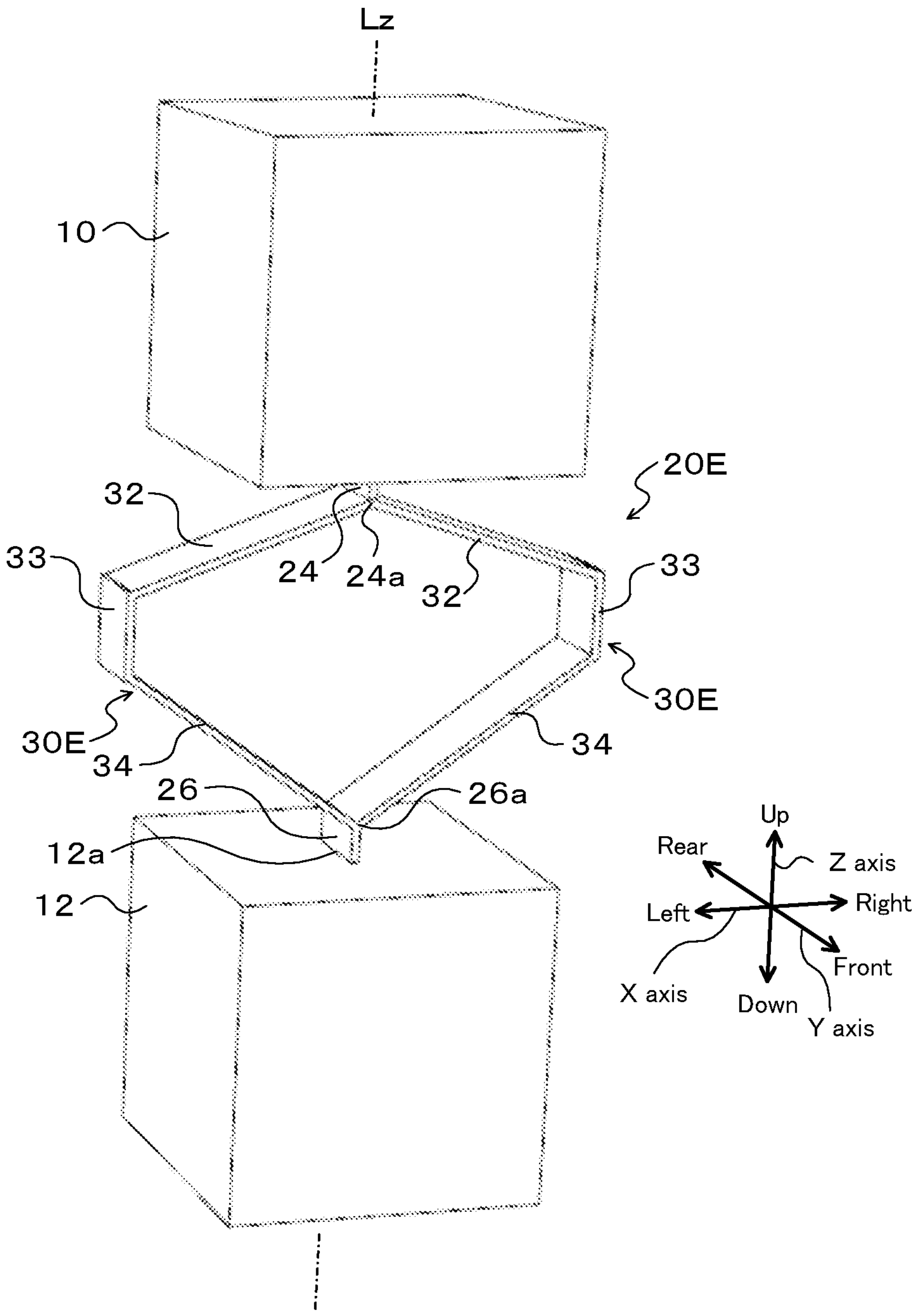
FIG. 11 is an external perspective view of a vibration isolating structure 20E according to comparative example.

The inventors also considered vibration isolating structures 20C, 20D and 20E other than the vibration isolating structures 20 and 20B in the embodiment and comparative examples. FIGS. 9 to 11 are external perspective views of the vibration isolating structures 20C, 20D and 20E of the comparative examples. The vibration isolating structure 20C of the comparative example shown in FIG. 9 differs from the vibration isolating structure 20 of the embodiment in that the angle θa (see FIG. 2) between the first beam 32 of each vibration isolator 30C and the downward direction of the axis line Lz (the side of the second shaft portion 26) is an acute angle. Therefore, in the vibration isolating structure 20 of the embodiment, the node 36 is located on the upper side (the side of the mounting member 10) with respect to the one end of the first beam 32 (the lower end 24*a* of the first shaft 24) and the one end of the second beam 34 (the upper end 26*a* of the second shaft 26) in the upward-downward direction, whereas in the vibration isolating structure 20C of the comparative example, the node 36 is located between the one end of the first beam 32 and the one end of the second beam 34 in the upward-downward direction of the figure. The vibration isolating structure 20D of the comparative example shown in FIG. 10 differs from the vibration isolating structure 20 of the embodiment in that the other end of the first beam 32 and the other end of the second beam 34 of each vibration isolator 30D are connected by a connecting beam 33 instead of the node 36. The vibration isolating structure 20E of the comparative example shown in FIG. 11 differs from the vibration isolating structure 20C of the comparative example in that the other end of the first beam 32 and the other end of the second beam 34 of each vibration isolator 30E are connected by the connecting beam 33 instead of the node 36.

Figure 12:
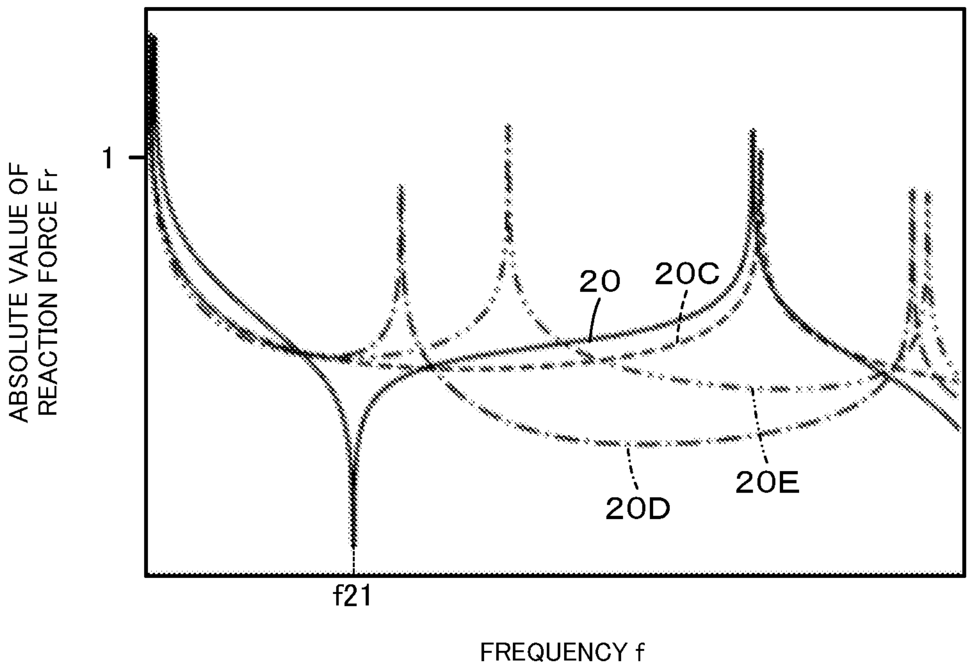
FIG. 12 is a diagram showing one example of the frequency characteristics of the vibration isolating structure 20, 20C, 20D, and 20E according to the embodiment and the comparative examples.
Figure 13:
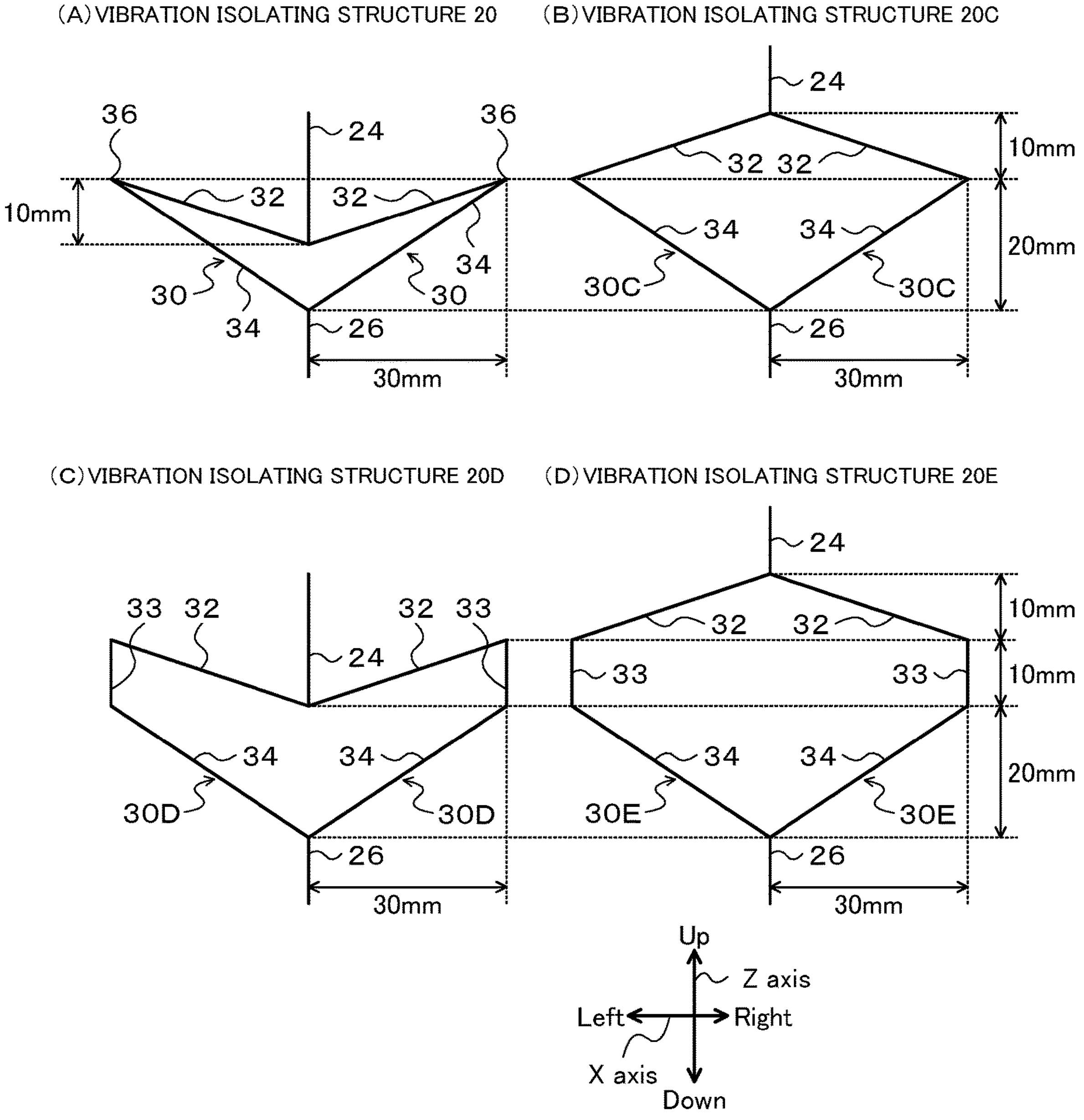
FIG. 13 is a diagram showing the dimensions of each part of the vibration isolating structure 20, 20C, 20D, and 20E according to one embodiment and comparative examples.

FIG. 12 is a diagram showing one example of the frequency characteristics of the vibration isolating structures 20, 20C, 20D, and 20E in the embodiment and the comparative examples. In FIG. 12, the horizontal axis (the linear axis) is the frequency f of the translational displacement Dv of the vibration exciter 10*a* and the first shaft 24, and the vertical axis (the logarithmic axis) is the absolute value of the reaction force Fr of the vibration receiver 12*a*. The inventors obtained the frequency characteristics shown in FIG. 12 by analyzing the vibration isolating structures 20, 20C, 20D and 20E. In this analysis, the vibration isolating structures 20, 20C, 20D and 20E are integrally molded from a material (equivalent to iron) having Young's modulus of 200 GPa, specific gravity of 7.85, and Poisson's ratio of 0.3. For the vibration isolating structures 20, 20C, 20D and 20E, the depth of each section was set to 10 mm, and the thickness of the first beam 32 and the second beam 34 was set to 0.5 mm. For the vibration isolating structures 20D and 20E, the thickness of the connecting beam 33 was set to 0.5 mm. In addition, the other dimensions for the vibration isolating structures 20, 20C, 20D and 20E are as shown in FIG. 13. FIG. 13 is a diagram showing the dimensions of each part of the vibration isolating structures 20, 20C, 20D and 20E in the embodiment and the comparative examples. FIG. 13(A) shows the vibration isolating structure 20, FIG. 13(B) shows the vibration isolating structure 20C, FIG. 13(C) shows the vibration isolating structure 20D, and FIG. 13(D) shows the vibration isolating structure 20E. As shown in FIGS. 13(A) to 13(D), for the vibration isolating structures 20, 20C, 20D, and 20E, the lengths of the first beam 32 in the upward-downward direction and the left-right direction are set to 10 mm and 30 mm, and the lengths of the second beam 34 in the upward-downward direction and the left-right direction are set to 20 mm and 30 mm. As shown in FIGS. 13(C) and 13(D), for the vibration isolating structures 20D and 20E, the length of the connecting beam 33 is set to 10 mm.

FIG. 12 shows that the vibration isolating structure 20C, 20D, and 20E in the comparative example does not exhibit the anti-resonance at any frequency, while the vibration isolating structure 20 in the embodiment exhibits the anti-resonance when the frequency f is the value f21. The reason why the vibration isolating structure 20C does not exhibit the anti-resonance is believed to be because the angle θa is the acute angle, the moment which attempts to rotate the node 36 by the first beam 32 and the moment which attempts to rotate the node 36 by the second beam 34 are opposite to each other, and the rotational displacement Dr of the node 36 is difficult to be excited, when the translational displacement Dt of the node 36 occurs with the translational displacement Dv of the first shaft 24 (the lower end 24*a*). The reason why the vibration isolating structures 20D and 20E do not exhibit the anti-resonance is believed to be because the first beam 32 and the second beam 34 are connected via the connecting beam 33, the degree of freedom of the translational displacement Dt of the node 36 relative to the translational displacement Dv of the first shaft 24 increases (without being geometrically fixed), and the rotational displacement Dr of the node 36 is not easily excited.

In the vibration isolating structure 20 of the embodiment described above, one end of the first beam 32 is connected to the lower end 24*a* of the first shaft 24, one end of the second beam 34 is connected to the upper end 26*a* of the second shaft 26, and the other end of the second beam 34 is connected to the other end of the first beam 32 via the node 36. The node 36 is located on the upper side (the side of the mounting member 10) compared to the one end of the first beam 32 and the one end of the second beam 34 in the upward-downward direction, and the rotational displacement Dr of the node 36 exhibits the anti-resonance at the first frequency within the frequency range higher than the first resonance frequency and lower than the second resonance frequency of the vibration isolating structure 20. This enables the vibration isolating structure 20 to exhibit the anti-resonance at the second frequency within this frequency range and to sufficiently reduce the vibration transmitted from the vibration exciter 10*a* to the vibration receiver 12*a* near the second frequency. The inventors have confirmed this by analysis.

The vibration isolating structure 20 of the embodiment is configured as an integrally molded member made of resin material, rubber material, metal material, or the like. This eliminates the need to join the first beam 32 and the second beam 34, and thus avoids the effects of these joints, s variations in the frequency characteristics of the vibration isolating structure 20.

Figure 14:
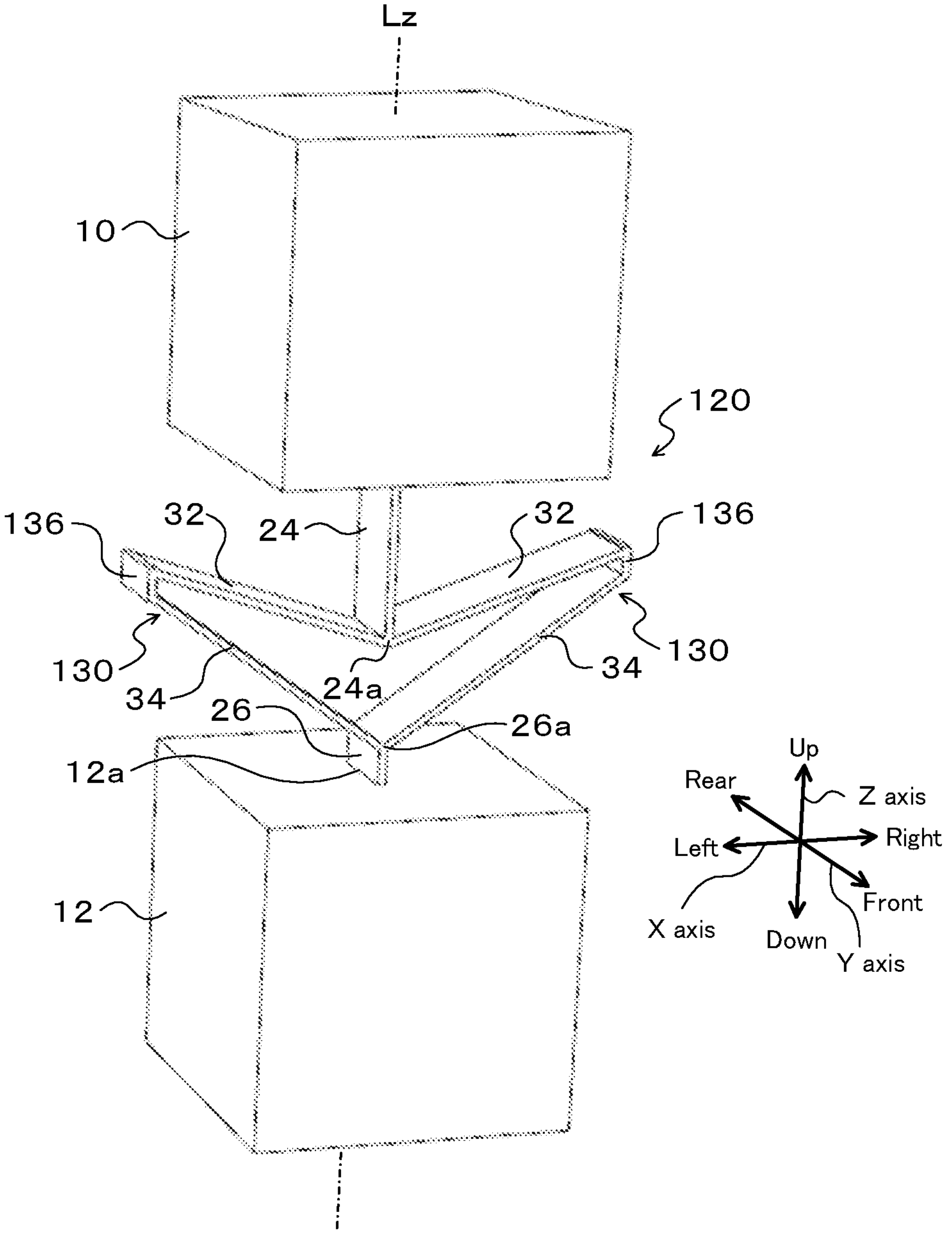
FIG. 14 is an external view of a vibration isolating structure 120 of a modification.

In the embodiment, as shown in FIGS. 1 and 2, in each of the vibration isolators 30 of the vibration isolating structure 20, the first beam 32 and the second beam 34 are connected via the node 36. Here, the shape of the node 36 is not particularly limited, and any shape that can be regarded as the node 36 may be used. In particular, the shape that can be regarded as the node 36 is a shape in which the rotational displacement Dr of the node 36 exhibits the anti-resonance at the first frequency within the frequency range higher than the first resonance frequency and lower than the second resonance frequency of the vibration isolating structure 20, and the vibration isolating structure 20 exhibits the anti-resonance at the second frequency within this frequency range. For example, as shown in the external perspective view of the vibration isolating structure 120 of the modification of FIG. 14, in each of the vibration isolators 130 of the vibration isolating structure 120, the first beam 32 and the second beam 34 may be connected via the node 136 which extends a sufficiently short length compared to the first beam 32 and the second beam 34 in the upward-downward direction in FIG. 14 (for example, equal to or less than ½ or ⅓ of the shorter of the lengths of the first beam 32 and the second beam 34 in the upward-downward direction).

Figure 15:
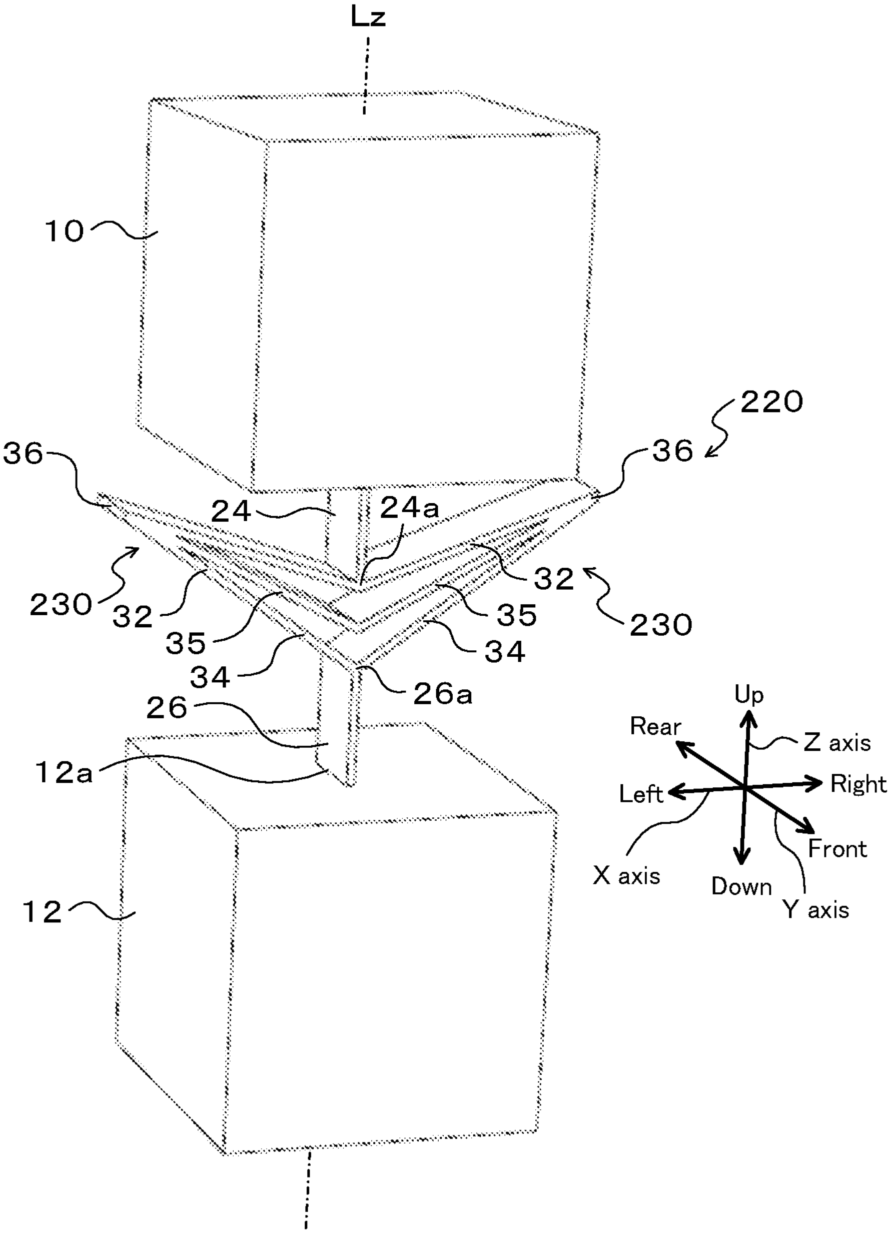
FIG. 15 is an external view of a vibration isolating structure 220 of a modification.

In the embodiment, as shown in FIGS. 1 and 2, the two vibration isolators 30 of the vibration isolating structure 20 have the first beam 32 and the second beam 34, respectively. However, as shown in the external perspective view of the vibration isolating structure 220 of the modification of FIG. 15, the two vibration isolators of 230 the vibration isolating structure 220 may have a third beam 35 in addition to the first beam 32 and the second beam 34, respectively. In the two vibration isolators 230, one end of the two third beams 35 is connected to each other between the lower end 24*a* of the first shaft 24 and the upper end 26*a* of the second shaft 26 in the upward-downward direction, and the other end of the two third beams 35 is connected to the other end of the first beam 32 and the other end of the second beam 34, respectively, through the corresponding node 36. The inventors have confirmed by analysis that in the vibration isolating structure 220, similar to the vibration isolating 20, structure the rotational displacement Dr of the node 36 exhibits the anti-resonance at the first frequency within the frequency range higher than the first resonance frequency and lower than the second resonance frequency of the vibration isolating structure 220, and the vibration isolating structure 220 (the reaction force Fr of the vibration receiver 12*a*) exhibits the anti-resonance at the second frequency within this frequency range.

Figure 16:
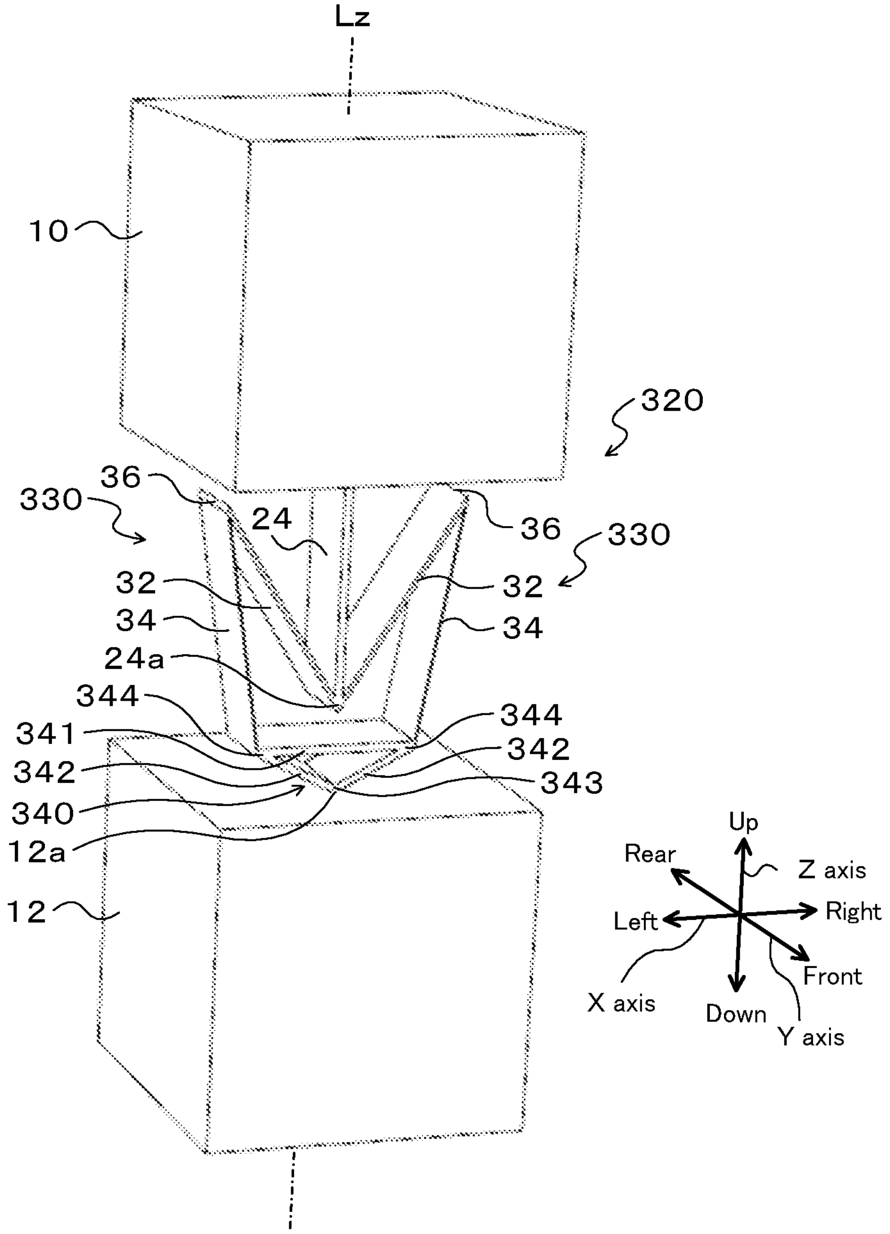
FIG. 16 is an external view of a vibration isolating structure 320 of a modification.

In the embodiment, as shown in FIGS. 1 and 2, in the two vibration isolators 30 of the vibration isolating structure 20, the first beam 32 is connected (fixed) to the vibration exciter 10*a* via the first shaft 24 and the second beam 34 is connected (fixed) to the vibration receiver 12*a* via the second shaft 26. However, the first beam 32 may be connected directly to the vibration exciter 10*a*, and the second beam 34 may be connected directly to the vibration receiver 12*a*. The first beam 32 may be connected to the vibration exciter 10*a* via a first lump part and/or a first truss part of a truss structure as a rigid body part other than the first shaft 24, and the second beam 34 may be connected to the vibration receiver 12*a* via a second lump part and/or a second truss part as a rigid body part other than the second shaft 26. For example, the vibration isolating structure 320, 420, and 520 may be formed into the shape shown in the external views perspective of the modifications of FIGS. 16 to 18.

FIG. 1 in that the two vibration isolators 30 and the second shaft 26 are replaced by two vibration isolators 330 and a truss part 340. Similar to the vibration isolating structure 20, the vibration isolating structure 320 is formed to be the mirror image of each other with respect to the predetermined planes Pyz and Pxz. In each vibration isolator 330 of the vibration isolating structure 320, one end of the first beam 32 is connected to the lower end 24*a* of the first shaft 24, one end of the second beam 34 is connected to the truss part 340, and the other end of the second beam 34 is connected to the other end of the first beam 32 via the node 36. The truss part 340 is formed in a shape of an isosceles triangle when viewed from the front side, having a base 341, a pair of equal sides 342, a vertex 343 corresponding to an apex angle, and a pair of vertices 344 corresponding to the pair of base angles. The vertex 343 is fixed to the upper surface of the base member 12, and the pair of vertices 344 are each connected to one end of the corresponding second beam 34. In this case, the fixed part by the vertex 343 in the base member 12 is the vibration receiver 12*a*.

Figure 17:
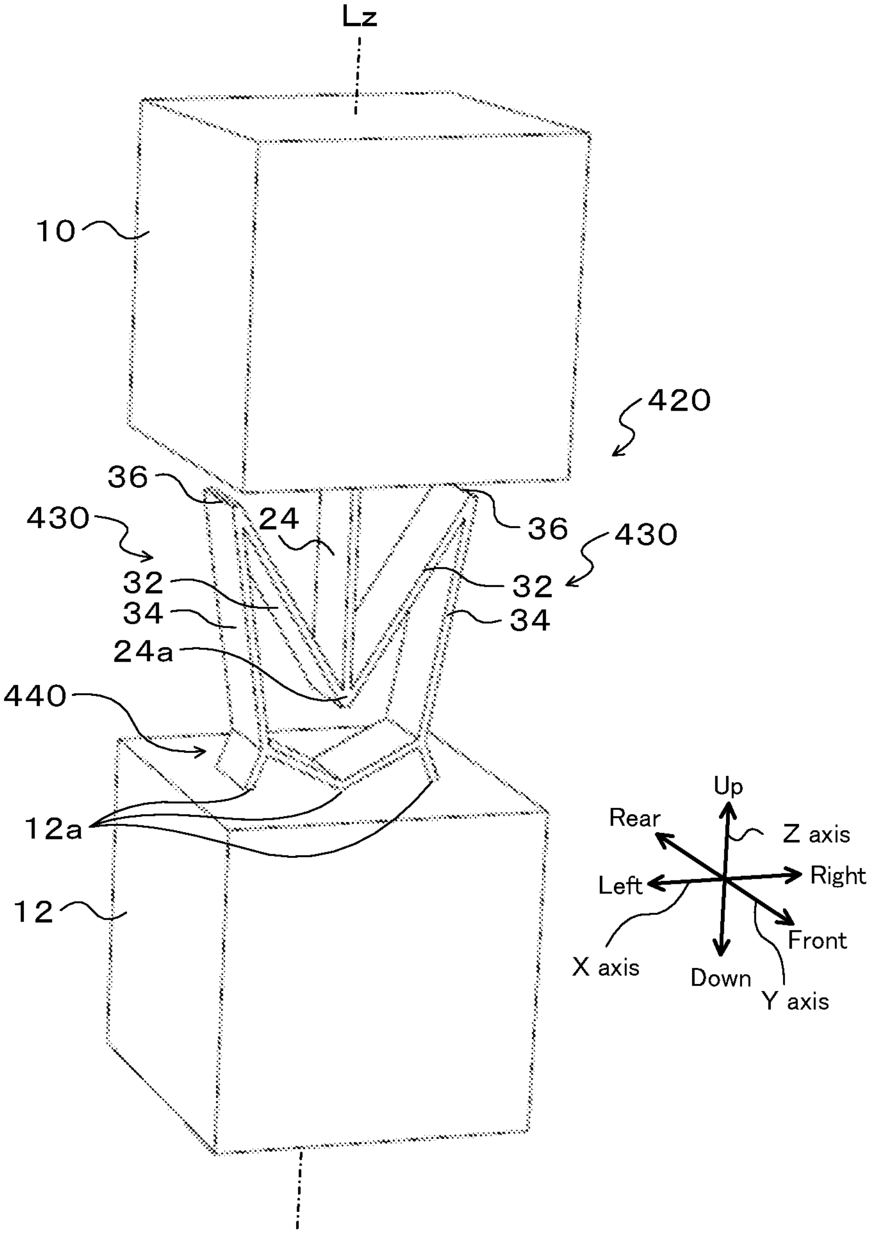
FIG. 17 is an external view of a vibration isolating structure 420 of a modification.

The vibration isolating structure 420 of FIG. 17 differs from the vibration isolating structure 20 of FIG. 1 in that the two vibration isolators 30 and the second shaft 26 are replaced by two vibration isolators 430 and two truss parts 440. Similar to the vibration isolating structure 20, the vibration isolating structure 420 is formed to be the mirror image of each other with respect to the predetermined planes Pyz and Pxz. In each of the vibration isolators 430 of the vibration isolating structure 420, one end of the first beam 32 is connected to the lower end 24*a* of the first shaft 24, one end of the second beam 34 is connected to the truss part 440, and the other end of the second beam 34 is connected to the other end of the first beam 32 via the node 36. Each truss section 440 has a side 441 and a side 442. The side 441 extends from one end of the second beam 34 and extends downwardly while approaching the predetermined plane Pyz (the axis line Lz), and is attached to the upper surface of the base member 12 near the axis line Lz. The side 442 extends from one end of the second beam 34 and extends downward while moving away from the predetermined plane Pyz and is fixed to the upper surface of the base member 12. In this case, the fixed parts by the sides 441 and 442 in the base member 12 are the vibration receivers 12*a*. The truss part 440 configures a truss structure with the side 441, the side 442, and the base member 12.

Figure 18:
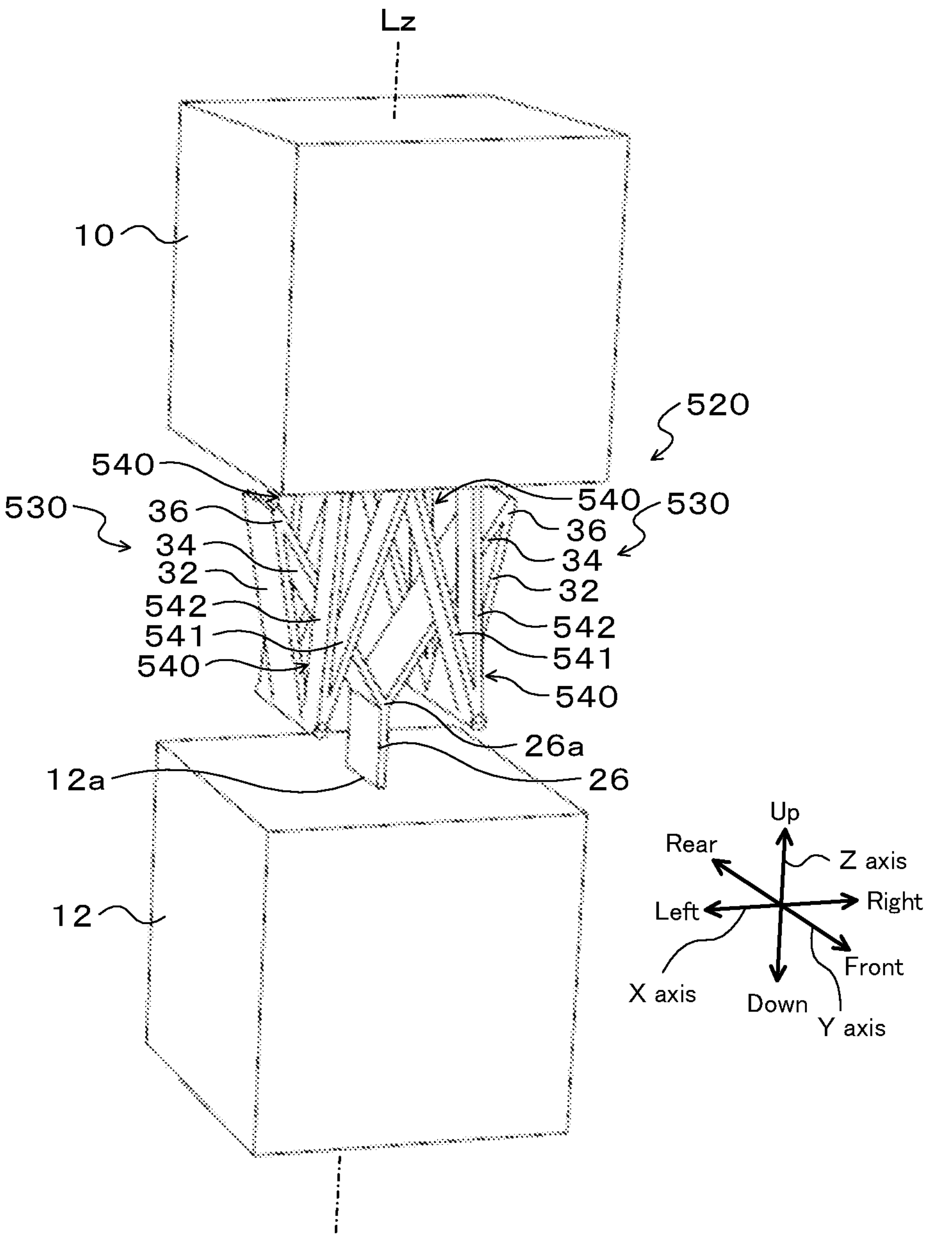
FIG. 18 is an external view of a vibration isolating structure 520 of a modification.

The vibration isolating structure 520 of FIG. 18 differs from the vibration isolating structure 20 of FIG. 1 in that the two vibration isolators 30 and the second shaft 26 are replaced by two vibration isolators 530 and four truss parts 540. Similar to the vibration isolating structure 20, the vibration isolating structure 520 is formed to be the mirror image of each other with respect to the predetermined planes Pyz and Pxz. In this vibration isolating structure 520, each vibration isolator 530 has one truss part 540 on the front side and one truss part 540 on the rear side. In each of the vibration isolator 530 of the vibration isolating structure 520, one end of the first beam 32 is connected to the two corresponding truss parts 540, one end of the second beam 34 is connected to the upper end 26*a* of the second shaft 26, and the other end of the second beam 34 is connected to the other end of the first beam 32 via the node 36. Each truss section 540 has a side 541 and a side 542. The side 541 extends forwardly or rearwardly from one end of the first beam 32 and extends upwardly while approaching the predetermined plane Pyz (the axis line Lz), and is attached to the lower surface of the mounting member 10 near the axis line Lz. The side 542 extends forwardly or rearwardly from one end of the first beam 32 and extends upwardly to be fixed to the lower surface of the mounting member 10. In this case, the fixed parts by the sides 541 and 542 in the mounting member 10 are the vibration exciters 10*a*. The truss part 540 configures a truss structure with the side 541, the side 542, and the mounting member 10.

The inventors have confirmed by analysis that in the vibration isolating structure 320, similar to the vibration isolating structure 20, the rotational displacement Dr of the node 36 exhibits the anti-resonance at the first frequency within the frequency range higher than the first resonance frequency and lower than the second resonance frequency of the vibration isolating structure 320, and the vibration isolating structure 320 (the reaction force Fr of the vibration receiver 12*a*) exhibits the anti-resonance at the second frequency within this frequency range. The inventors have confirmed the same for the vibration isolating structures 420 and 520.

In the embodiment and modification described above, in the two vibration isolators 30 of the vibration isolating structure 20, the node 36 is located on the upper side (the side of the mounting member 10) with respect to one end of the first beam 32 and one end of the second beam 34 in the upward-downward direction in the figure. However, the node 36 may be located on the lower side (the side of the base member 12) with respect to the one end of the first beam 32 and the one end of the second beam 34.

In the embodiment and modifications described above, the two vibration isolators 30, etc. of the vibration isolating structure 20 are formed in a shape that is the mirror image (plane symmetry) of each other with respect to the predetermined plane Pyz. However, the two vibration isolators 30, etc. may be formed in a slightly different shape with respect to the predetermined plane Pyz, such as a shape in which the distance between the node 36 and the predetermined plane Pyz is slightly different.

Figure 19:
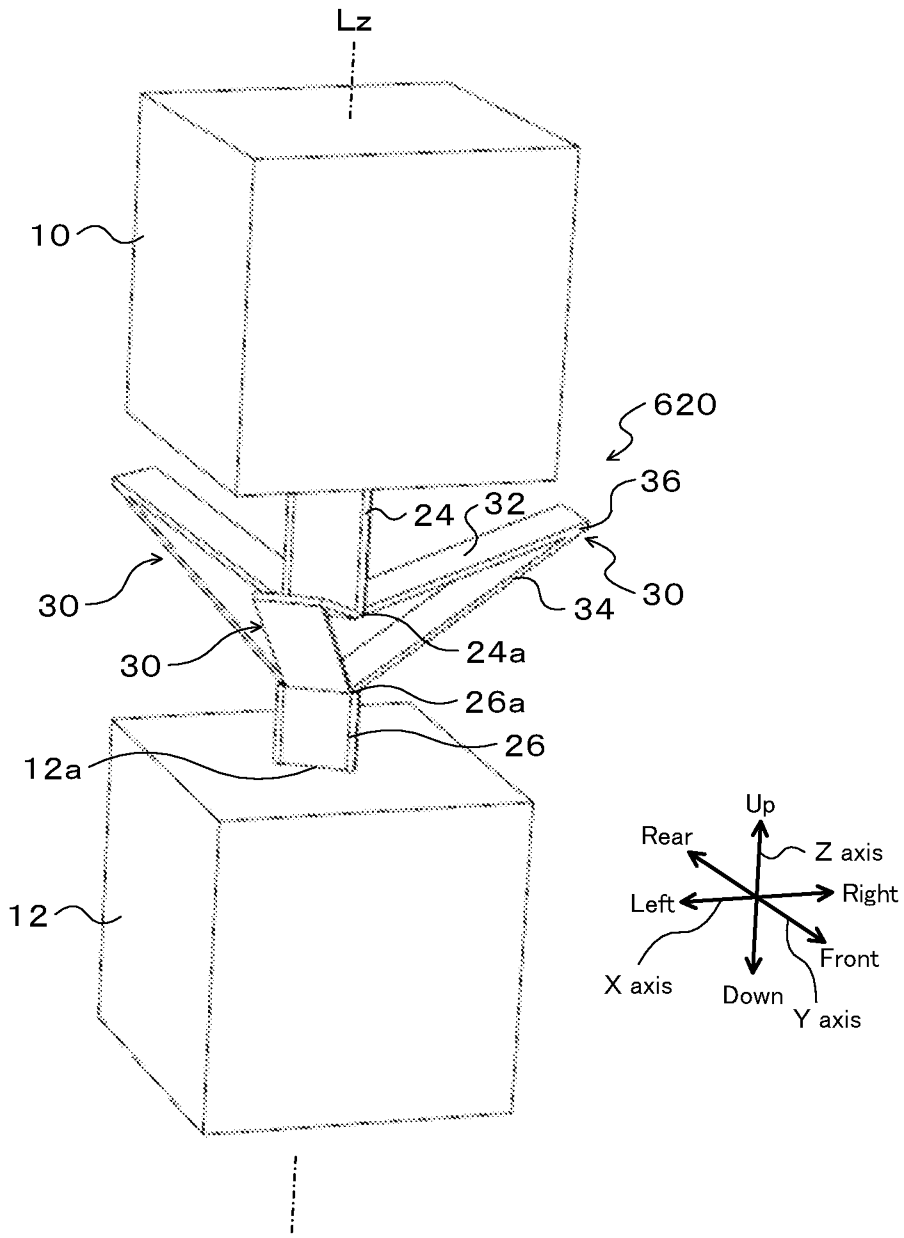
FIG. 19 is an external view of a vibration isolating structure 620 of a modification.
Figure 20:
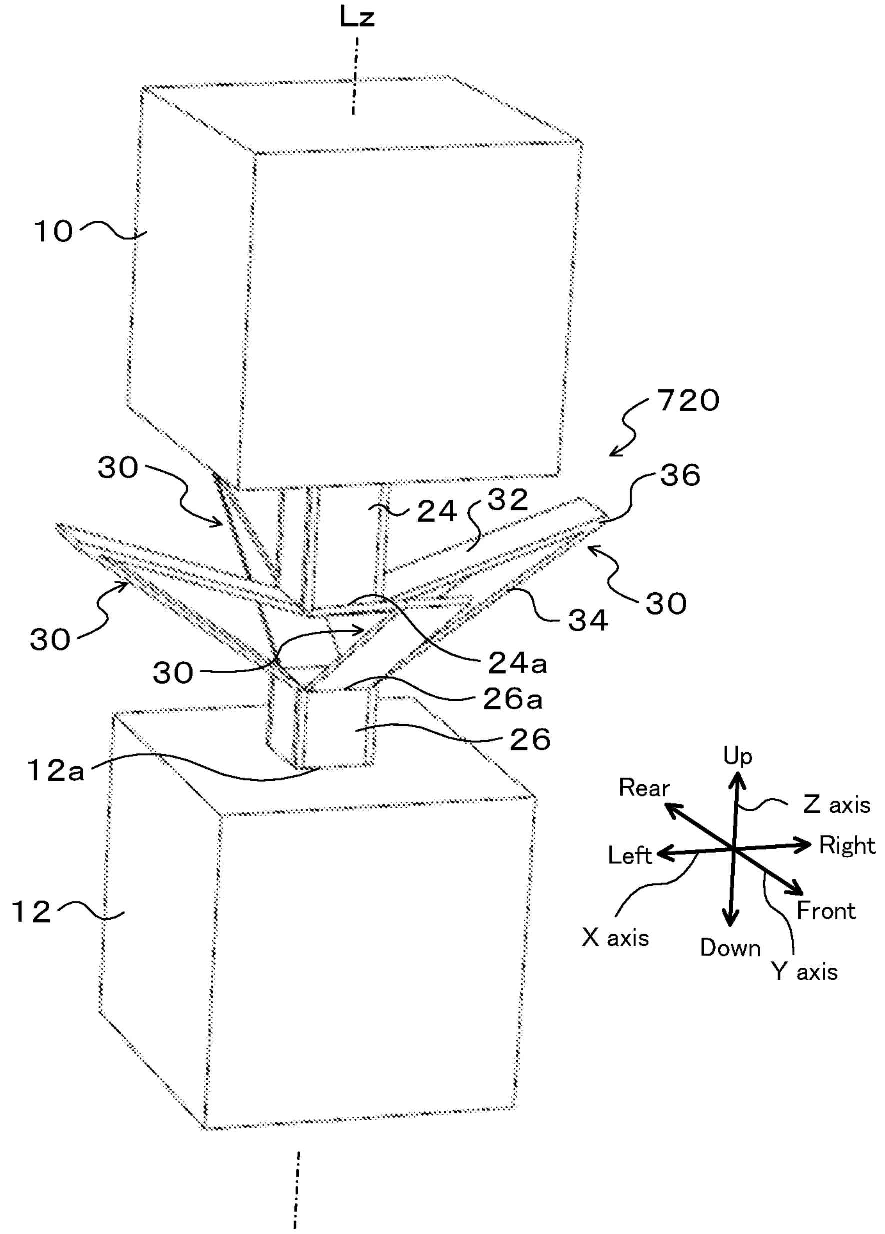
FIG. 20 is an external view of a vibration isolating structure 720 of a modification.

In the embodiment, the vibration isolating structure 20 are formed to be the mirror image (plane symmetry) of each other with respect to the predetermined plane Pyz. In other words, the vibration isolating structure 20 includes two vibration isolators 30 on one side (e.g., right side) with respect to the predetermined plane Pyz such that they are rotationally symmetric at 180° intervals around the axis line Lz. However, as shown in the external perspective view of the modification of the vibration isolating structure 620 in FIG. 19, the vibration isolating structure 620 may include three vibration isolators 30 similar to the vibration isolating structure 20 such that they are rotationally symmetric at 120° intervals around the axis line Lz. As shown in the external perspective view of the modification of the vibration isolating structure 720 in FIG. 20, the vibration isolating structure 720 may include four vibration isolators 30 such that they are rotationally symmetric at 90° intervals around the axis line Lz. Further, the vibration isolating structure may include five or more than five vibration isolators 30 such that they are rotationally symmetric at equal intervals around the axis line Lz. In these cases, the plurality of vibration isolators 30 may be formed into a shape that is slightly different from rotationally symmetric, for example, a shape that has a slightly different distance between the node 36 and the predetermined plane Pyz. In the case of including four, six, or other vibration isolators, the vibration isolators 30, i.e., the vibration isolator having the node 36 located on the upper side (the side of the mounting member 10) with respect to one end of the first beam 32 and one end of the second beam 34, and the vibration isolator having this node 36 inverted, may be formed alternately around the axis line Lz. In addition, the plurality of vibration isolators 30 may be formed at intervals slightly different from equal intervals, for example, at intervals of 120°, 115°, 125°, etc. when three vibration isolators 30 are included. The inventors have confirmed by analysis that in the vibration isolating structure 620, similar to the vibration isolating structure 20, the rotational displacement Dr of the node 36 exhibits the anti-resonance at the first frequency within the frequency range higher than the first resonance frequency and lower than the second resonance frequency of the vibration isolating structure 620, and the vibration isolating structure 620 (the reaction force Fr of the vibration receiver 12*a*) exhibits the anti-resonance at the second frequency within this frequency range. The inventors have confirmed the same for the vibration isolating structure 720.

In the embodiment, each vibration isolating structure, such as the vibration isolating structure 20, is configured as an integrally molded member made of resin material, rubber material, metal material, or the like. However, it may also be configured as a plurality of parts molded and joined together.

The following describes the correspondence relationship between the primary elements of the above embodiment and the primary elements of the disclosure described in Summary. In the embodiment, the first beam 32 corresponds to the "first beam", and the second beam 34 corresponds to the "second beam".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

Additional Notes

A vibration isolating structure capable of reducing vibration transmitted from a vibration exciter to a vibration receiver, includes a first beam, one end of which is connected to the vibration exciter directly or via a first support and a second beam, one end of which is connected to the vibration receiver directly or via a second support and the other end of which is connected to the other end of the first beam via a node. The node is located on a first position side of the vibration exciter or a second position side of the vibration receiver with respect to the one end of the first beam and the one end of the second beam in an axial direction of an axis passing through the first position and the second position. A rotational displacement of the node is excited by a translational displacement of the vibration exciter and a translational displacement of the node associated with the translational displacement of the vibration exciter, and exhibits anti-resonance at a frequency within a frequency range higher than a first resonance frequency and lower than a second resonance frequency of the vibration isolating structure.

In the vibration isolating structure, the rotational displacement of the node is excited by the translational displacement of the vibration exciter and the translational displacement of the node associated with the translational displacement of the vibration exciter, and exhibits the anti-resonance at the frequency (a first frequency) within the frequency range higher than the first resonance frequency and lower than the second resonance frequency of the vibration isolating structure. This enables the vibration isolating structure to exhibit the anti-resonance at a second frequency within this frequency range, and to sufficiently reduce the vibration transmitted from the vibration exciter to the vibration receiver near that second frequency. The inventors have confirmed this by analysis.

In the vibration isolating structure, the vibration isolating structure may include a plurality of vibration isolators, each having the first beam and the second beam, around the axis. In this case, the plurality of vibration isolators may be formed at equal intervals around the axis.

In the vibration isolating structure, the vibration isolating structure may be an integrally molded member.

The invention claimed is:

1. A vibration isolating structure capable of reducing vibration transmitted from a vibration exciter to a vibration receiver, comprising:

a first beam, one end of which is connected to the vibration exciter directly or via a first support; and a second beam, one end of which is connected to the vibration receiver directly or via a second support and the other end of which is connected to the other end of the first beam via a node, wherein the node is located (i) between (a) the vibration exciter and (b) the one end of the first beam and the one end of the second beam in an axial direction of an axis passing through the vibration exciter and vibration receiver, or (ii) between (a) the vibration receiver and (b) the one end of the first beam and the one end of the second beam in the axial direction, a rotational displacement of the node is caused by (i) a translational displacement of the vibration exciter and (ii) a translational displacement of the node associated with the translational displacement of the vibration exciter, and the rotational displacement of the node exhibits anti-resonance at a frequency within a frequency range higher than a first resonance frequency of the vibration isolating structure and lower than a second resonance frequency of the vibration isolating structure.

2. The vibration isolating structure according to claim 1, wherein:

the first beam comprises a plurality of first beams, the second beam comprises a plurality of second beams, and a plurality of vibration isolators, each having a respective one of the first beams and a respective one of the second beams, are formed around the axis.

3. The vibration isolating structure according to claim 2, wherein the plurality of vibration isolators are formed at equal intervals around the axis.

4. The vibration isolating structure according to claim 1, wherein the vibration isolating structure is an integrally molded member.

* * * * *